(12) United States Patent
Stewart

(10) Patent No.: US 11,346,688 B2
(45) Date of Patent: May 31, 2022

(54) MAGNETIC FIELD SENSORS FOR DETECTING ABSOLUTE POSITION OF MULTI-TRACK TARGETS

(71) Applicant: Allegro MicroSystems, LLC, Manchester, NH (US)

(72) Inventor: Logan G. Stewart, Portland, OR (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 16/920,869

(22) Filed: Jul. 6, 2020

(65) Prior Publication Data
US 2022/0003572 A1    Jan. 6, 2022

(51) Int. Cl.
*G01D 5/14* (2006.01)

(52) U.S. Cl.
CPC .................................. *G01D 5/145* (2013.01)

(58) Field of Classification Search
CPC ...................................................... G01D 5/145
See application file for complete search history.

(56) References Cited

U.S. PATENT DOCUMENTS

| | | | |
|---|---|---|---|
| 4,556,886 A | 12/1985 | Shimizu et al. | |
| 5,430,373 A * | 7/1995 | Ichikawa ............... | G01D 5/145 324/207.21 |
| 5,905,350 A | 5/1999 | Hofbauer et al. | |
| 6,525,531 B2 | 2/2003 | Forrest et al. | |
| 6,556,153 B1 | 4/2003 | Cardamone | |
| 7,362,094 B2 | 4/2008 | Voisine et al. | |
| 9,797,746 B2 | 10/2017 | Vuillermet et al. | |
| 10,495,699 B2 | 12/2019 | Burdette et al. | |
| 10,578,679 B2 | 3/2020 | Sitorus et al. | |
| 2005/0122242 A1 | 6/2005 | Inenaga et al. | |
| 2007/0145970 A1 | 6/2007 | Takahashi | |

(Continued)

FOREIGN PATENT DOCUMENTS

DE    10 2017 221 883 A1    6/2019

OTHER PUBLICATIONS

U.S. Appl. No. 16/507,560, filed Jul. 10, 2019, Lassalle-Balier et al.
U.S. Appl. No. 16/689,494, filed Nov. 20, 2019, Foletto.
Allegro "Precision Hall-Effect Angle Sensor IC" Datasheet No. A1334; A1334A-DS, Rev. 9 MCO-0000465 dated Nov. 2, 2018, 19 pages.

(Continued)

*Primary Examiner* — Clayton E. LaBalle
*Assistant Examiner* — Michael A Harrison
(74) *Attorney, Agent, or Firm* — Daly, Crowley, Mofford & Durkee, LLP

(57) ABSTRACT

A magnetic field sensor for sensing an absolute position of a target includes a first magnetic field sensing element disposed proximate to a first portion of the target having a first cross-sectional shape configured to generate a first periodic magnetic field signal in response to movement of the first target portion and a second magnetic field sensing element disposed proximate to a second portion of the target having a second cross-sectional shape configured to generate a second periodic magnetic field signal in response to movement of the second target portion, wherein the first periodic magnetic field signal and the second periodic magnetic field signal have a substantially constant phase separation. An output format module responsive to the first periodic magnetic field signal and the second periodic magnetic field signal is configured to generate an output signal of the magnetic field sensor.

20 Claims, 23 Drawing Sheets

(56) References Cited

U.S. PATENT DOCUMENTS

| | | | |
|---|---|---|---|
| 2008/0061771 A1 | 3/2008 | Sugiyama et al. | |
| 2008/0198498 A1* | 8/2008 | Van Bijnen | G11B 19/26 360/71 |
| 2009/0315544 A1 | 12/2009 | Takahashi et al. | |
| 2011/0309824 A1 | 12/2011 | Takahashi et al. | |
| 2013/0277782 A1 | 10/2013 | Doogue et al. | |
| 2014/0055772 A1* | 2/2014 | Neubauer | B62M 3/003 356/28 |
| 2015/0160427 A1* | 6/2015 | Miyashita | G02B 7/09 359/826 |
| 2015/0253153 A1 | 9/2015 | Smithanik et al. | |
| 2016/0363638 A1 | 12/2016 | Daubert | |
| 2017/0045380 A1 | 2/2017 | Ueda et al. | |
| 2019/0310111 A1 | 10/2019 | Werth et al. | |
| 2020/0041310 A1 | 2/2020 | Lassalle-Balier et al. | |
| 2020/0041583 A1 | 2/2020 | Cadugan et al. | |
| 2020/0232822 A1 | 7/2020 | Weiland et al. | |
| 2020/0232823 A1 | 7/2020 | Weiland et al. | |

OTHER PUBLICATIONS

U.S. Non-Final Office Action dated May 1, 2020 for U.S. Appl. No. 16/254,869; 22 Pages.
Response to Office Action filed on Jul. 24, 2020 for U.S. Appl. No. 16/254,869; 16 pages.
U.S. Non-Final Office Action dated Apr. 28, 2020 for U.S. Appl. No. 16/254,874; 33 Pages.
Response to Office Action filed on Jul. 24, 2020 for U.S. Appl. No. 16/254,874; 22 pages.
Response to Office Action filed on Oct. 20, 2020 for U.S. Appl. No. 16/254,874; 13 pages.
Notice of Allowance dated Nov. 3, 2020 for U.S. Appl. No. 16/254,874; 5 pages.
Notice of Allowance dated Sep. 1, 2020 for U.S. Appl. No. 16/254,869; 6 pages.
Final Office Action dated Sep. 1, 2020 for U.S. Appl. No. 16/254,874; 5 pages.

* cited by examiner

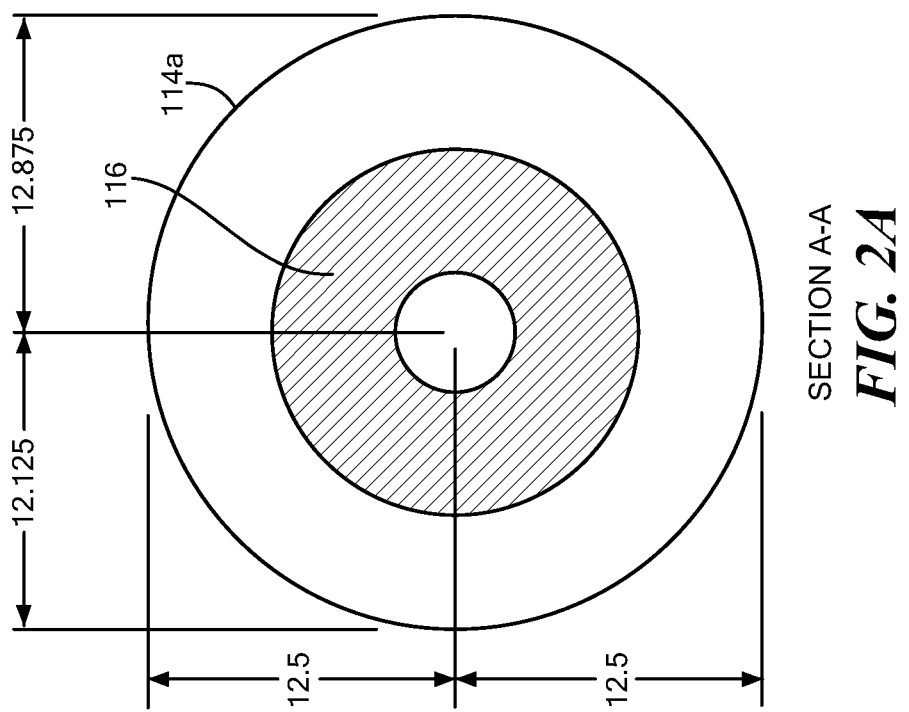
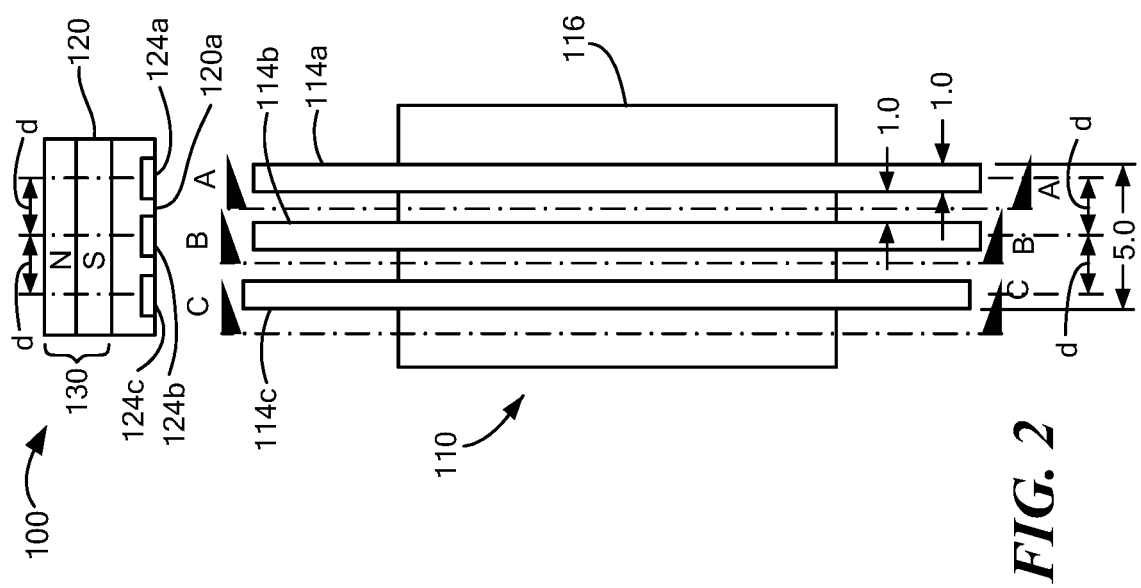

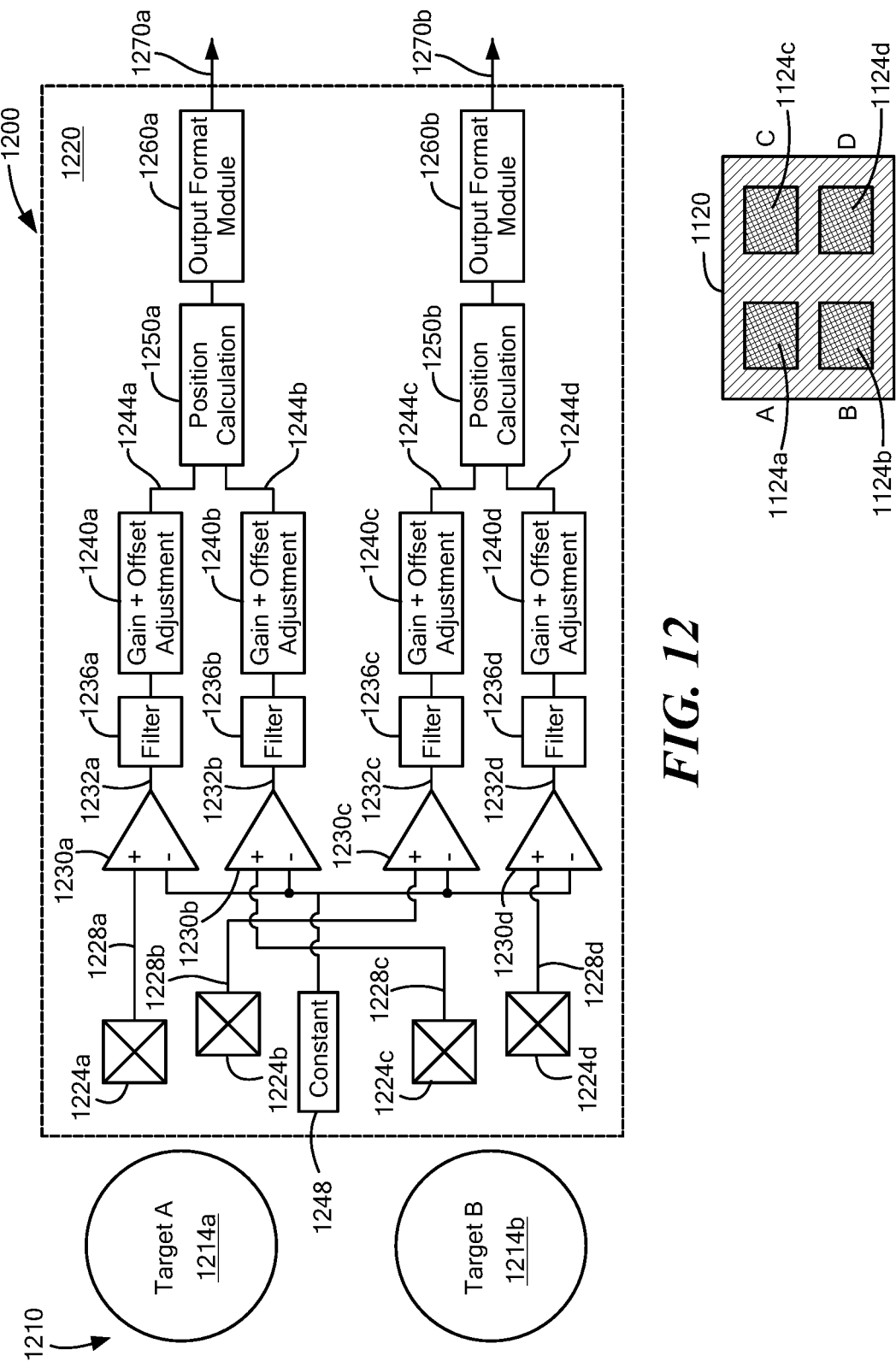

SECTION A-A

SECTION B-B

SECTION C-C

SECTION A-A

SECTION B-B

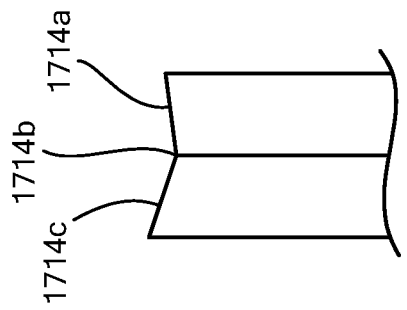
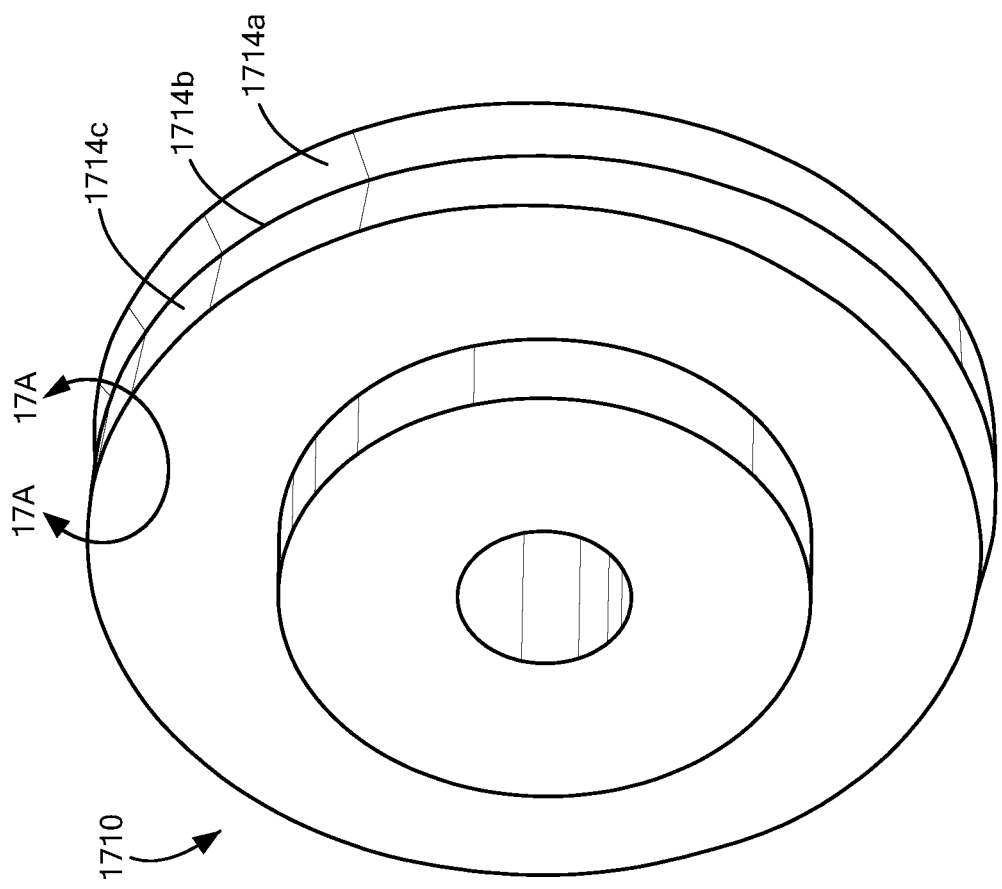

MAGNETIC FIELD SENSORS FOR DETECTING ABSOLUTE POSITION OF MULTI-TRACK TARGETS

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to magnetic field sensors, and, more particularly, to a magnetic field sensor that can detect an absolute position (e.g., a rotational absolute angle) of a multi-track target.

BACKGROUND

Various types of magnetic field sensing elements are known, including Hall effect elements and magnetoresistance elements. Magnetic field sensors generally include one or more magnetic field sensing elements and other electronic components. Some magnetic field sensors also include a permanent magnet in a so-called "back-biased" arrangement in which a moving ferromagnetic target object can cause fluctuations in the magnetic field of the magnet, which is sensed by the back-biased magnetic field sensor. Other magnetic field sensors can sense motion of a magnetic target object.

Magnetic field sensors provide an electrical signal representative of a sensed magnetic field. In some back-biased arrangements, the sensed magnetic field is a magnetic field generated by the magnet and varied in accordance with a shape or profile of the moving ferromagnetic object. In contrast, magnetic field sensors that sense a moving magnet directly sense variations of magnetic field magnitude and direction that result from movement of the magnet.

Magnetic field angle sensors can be used to provide angular position information and rotational speed and direction information of a target. Such sensors can be used in a wide array of applications such as industrial automation, robotics, power steering, motor position sensing and various vehicle applications such as seatbelt motor systems, transmission actuators, fuel management, ignition timing control, wheel speed sensors, electronic braking systems and throttle systems. For example, in some applications, angle sensors detect movement of features of a ferromagnetic gear, such as gear teeth and/or gear slots or "valleys". In some arrangements, the ferromagnetic gear is placed adjacent to an object, for example, a camshaft in an engine or the shaft of an electric motor. Thus, it is the rotation of the object (e.g., camshaft) that is sensed by detecting the moving features of the ferromagnetic gear.

SUMMARY

Described herein are magnetic field sensors that detect an absolute position (e.g., an absolute angle of rotation) of a target object having a simplified multi-track target design. Positioning of at least first and second magnetic field elements with respect to first and second respective target portions provides a substantially constant phase separation of the resulting magnetic field signals established by the target design. Embodiments in which the target results in a single magnetic field signal period per revolution permit absolute position to be detected without requiring target movement. Differential embodiments can improve stray field immunity.

According to the disclosure, a magnetic field sensor for sensing an absolute position of a target includes a first magnetic field sensing element disposed proximate to a first portion of the target having a first cross-sectional shape configured to generate a first periodic magnetic field signal in response to movement of the first target portion, a second magnetic field sensing element disposed proximate to a second portion of the target having a second cross-sectional shape configured to generate a second periodic magnetic field signal in response to movement of the second target portion, wherein the first periodic magnetic field signal and the second periodic magnetic field signal have a substantially constant phase separation and an output format module. The output format module is responsive to the first periodic magnetic field signal and the second periodic magnetic field signal and configured to generate an output signal of the magnetic field sensor.

Features may include one or more of the following individually or in combination with other features. The first cross-sectional shape of the first target portion and the second cross-sectional shape of the second target portion can be substantially oval and the first and second periodic magnetic field signals can be substantially sinusoidal. The first periodic magnetic field signal has a first repeating pattern and the second periodic magnetic field signal has a second repeating pattern and each of a first angle of repetition of the first repeating pattern and a second angle of repetition of the second repeating pattern can be equal to 360°. Each the first cross-sectional shape of the first target portion and the second cross-sectional shape of the second target portion can have a single axis of symmetry. In some embodiments, the axes of symmetry of the first cross-sectional shape of the first target portion and the second cross-sectional shape of the second target portion are offset from each other by ninety degrees. The phase separation between the first periodic magnetic field signal and the second periodic magnetic field signal can be ninety degrees. The first periodic magnetic field signal has a first repeating pattern and the second periodic magnetic field signal has a second repeating pattern and, in some embodiments, an angle of repetition of the first repeating pattern can be the same as an angle of repetition of the second repeating pattern. In other embodiments, the angle of repetition of the first repeating pattern is different than an angle of repetition of the second repeating pattern.

The magnetic field sensor can further include a position detection module configured to use the first magnetic field signal and the second magnetic field signal to generate a position value indicative of the absolute position of the target. The output format module can be coupled to receive the position value and to generate the output signal of the magnetic field sensor. The absolute position of the target can include an absolute angle of rotation of the target. In some embodiments, the target can be configured to rotate about an axis of rotation with each of the first and second target portions rotatable about the axis of rotation and wherein the magnetic field sensor is positioned radially with respect to the axis of rotation of the target. In some embodiments, the target is configured to rotate about an axis of rotation with each of the first and second target portions rotatable about the axis of rotation and wherein the magnetic field sensor is positioned axially with respect to the axis of rotation of the target. In some embodiments the target is configured to move linearly with respect to the magnetic field sensor.

Each of the first magnetic field signal and the second magnetic field signal can have a constant reference potential. A third magnetic field sensing element can be disposed proximate to a third portion of the target having a third cross-sectional shape configured to generate the constant reference potential in response to movement of the third target portion. In embodiments, the third cross-sectional shape of the third target portion is a circle. The magnetic field sensor can further include a position detection module configured to use the first magnetic field signal, the second magnetic field signal, and the constant. The output format module can be coupled to receive the position value and to generate the output signal of the magnetic field sensor. The magnetic field sensor can further include a magnet, wherein the first magnetic field sensing element and the second magnetic field sensing element are disposed between the magnet and the target. The target can be a ring magnet.

Also described is a system including a target including a plurality of tracks, wherein a first one of the plurality of tracks is spaced from a second one of the plurality of tracks by a predetermined distance and a magnetic field sensor for sensing an absolute position of the target. The magnetic field sensor can include a first magnetic field sensing element disposed proximate to a first track of the plurality of tracks and configured to generate a first periodic magnetic field signal in response to movement of the first track, a second magnetic field sensing element disposed proximate to the second track of the plurality of tracks and configured to generate a second periodic magnetic field signal in response to movement of the second track, wherein the first periodic magnetic field signal and the second periodic magnetic field signal have a substantially constant phase separation associated with the predetermined distance between the first track and the second track and an output format module responsive to the first periodic magnetic field signal and the second periodic magnetic field signal and configured to generate an output signal of the magnetic field sensor.

Features may include one or more of the following individually or in combination with other features. The phase separation between the first periodic magnetic field signal and the second periodic magnetic field signal can be ninety degrees. Each of the first magnetic field signal and the second magnetic field signal can have a constant reference potential. The magnetic field sensor can include a third magnetic field sensing element disposed proximate to a third track of the plurality of tracks configured to generate the constant reference potential in response to movement of the third target portion. The target can be rotatable about an axis of rotation and wherein the magnetic field sensor is configured to sense an absolute rotational position of the target.

BRIEF DESCRIPTION OF THE DRAWINGS

The foregoing features of the invention, as well as the invention itself may be more fully understood from the following detailed description of the drawings, in which:

FIG. 2 is a cross-sectional view of the system of FIG. 1;

FIG. 2A is a cross-sectional view of the target of FIG. 2 taken along line A-A of FIG. 2;

FIG. 12 is a block diagram of another example magnetic field sensor proximate to a target and including multiple magnetic field sensing elements per target portion;

FIG. 12A is a simplified cross-sectional plan view of an example magnetic field sensor of FIG. 12 having four sensing elements in a stacked configuration;

FIG. 17 is a perspective view of another example target for use with the magnetic field sensors of FIGS. 6-9;

FIG. 17A is an enlarged side view of a portion of the target taken along line 17A-17A of FIG. 17.

DETAILED DESCRIPTION

Figure 1:
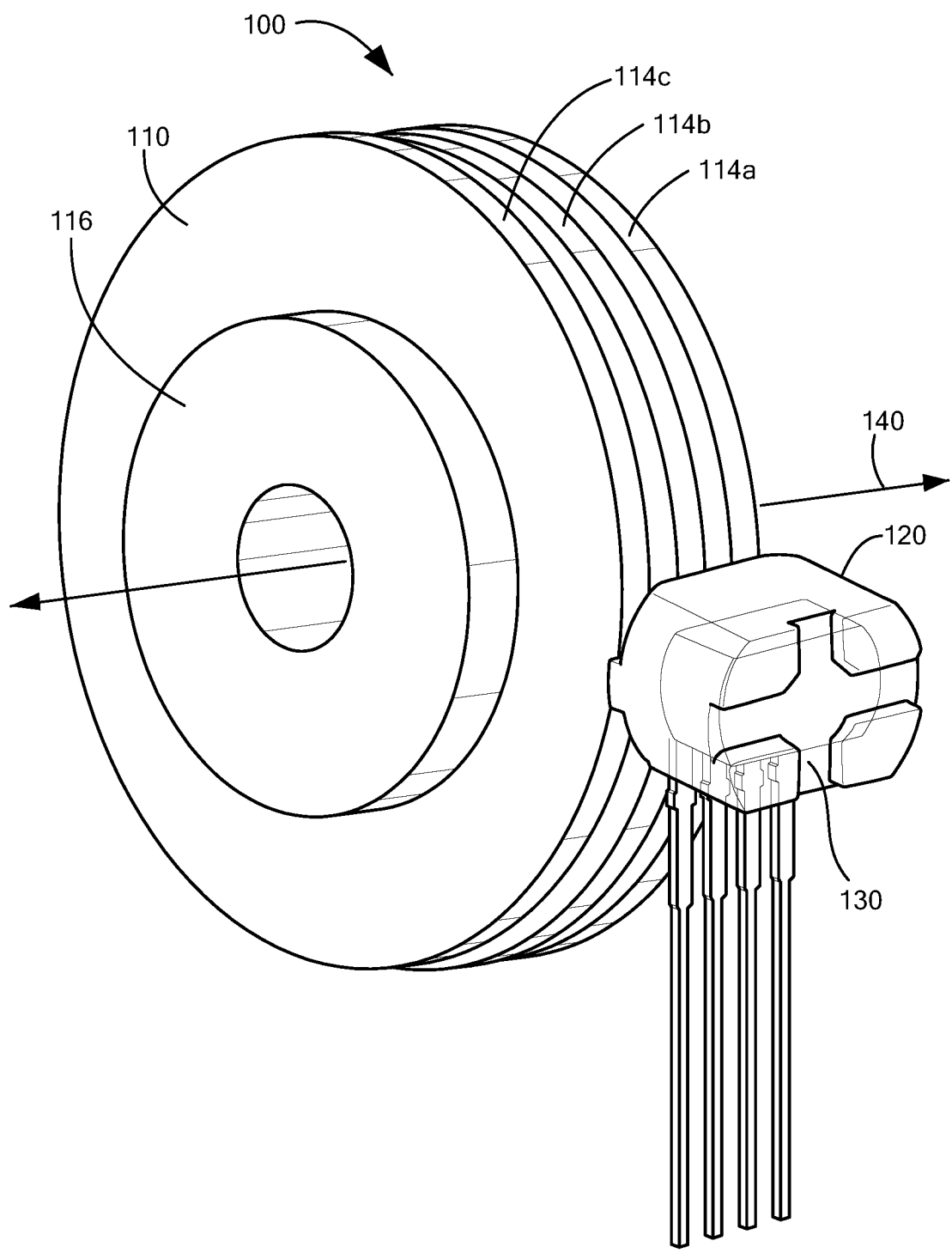
FIG. 1 is a perspective view of a position sensing system including a magnetic field sensor proximate to a rotatable target, with the sensor radially positioned with respect to the axis of rotation.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half-bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the term "processor" or "controller" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital. A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

In particular, it should be understood that a so-called comparator can be comprised of an analog comparator having a two state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

The terms "absolute position" and "absolute angle" are used to refer to a position (e.g., an angle) of a target object relative of a reference position established by a position of a magnetic field sensor.

Referring to FIGS. 1 and 2, an absolute position detection system 100 includes a magnetic field sensor 120 and a target 110 capable of movement relative to the sensor. Example target 110 is rotatable about an axis of rotation 140 and the sensing elements of sensor 120 are positioned radially with respect to the axis of rotation such that a front face 120a (FIG. 2) of the sensor 120 faces the tracks 114a-114c, as shown. Other relative positioning of the sensor with respect to the target are possible, such as the axial sensor positioning shown in FIG. 15. Furthermore, other types of target movement are possible. For example, linear motion is explained in connection with FIG. 15 below.

Target 110 includes a plurality of tracks 114a, 114b, 114c spaced from each other by a predetermined distance "d". Sensor 120 includes a first magnetic field sensing element 124a disposed proximate to a first target portion, or track 114a, a second magnetic field sensing element 124b disposed proximate to a second target portion, or track 114b, and a third magnetic field sensing element 124c disposed proximate to a third target portion or track 114c. Sensing elements 124a-124c can take the form of various types of magnetic field sensing elements including, but not limited to Hall effect elements, GMR elements, TMR elements, etc.

Sensor 120 is positioned with respect to the target 110 such that each sensing element 124a-124c is centered with respect to a centerline of the respective track 114a-114c. Thus, it will be appreciated that the predetermined distance "d" between tracks 114a-114c corresponds to the distance "d" between sensing elements 124a-124c. Sensor and target dimensions can be mutually optimized to meet application specifications and requirements.

In embodiments in which there are three or more target tracks 114a-114c and corresponding sensing elements 124a-124c, the distance between each pair of adjacent tracks and sensing elements can be the same as illustrated or, in some embodiments, can be different. For example, in embodiments with four target tracks and sensing elements, the distance between outer pairs of adjacent tracks can be larger than the distance between centrally located pairs of adjacent tracks in order to thereby tailor the magnetic field incident on the sensing elements to make it more uniform.

The magnetic field sensing elements 124a-124c can be coupled in various ways to generate two or more periodic magnetic field signals in response to movement of the target 110. Example circuitry within the sensor 120 is shown and described in connection with FIGS. 6-9. Suffice it to say here that the periodic magnetic field signals have a substantially constant (i.e., fixed) phase separation with respect to each other, which phase separation is established by the predetermined distance between the target tracks 114a-114c (and thus also the corresponding sensing element spacing). Stated differently, the phase separation of the periodic magnetic field signals does not change with rotation of the target. Sensor 120 further includes an output format module responsive to the periodic magnetic field signals and configured to generate an output signal of the magnetic field sensor as will be described.

By periodic it is meant that each of the magnetic field signals has a repeating pattern. The angle of repetition of the repeating pattern of the periodic magnetic field signals can be equal to 360° to achieve a single period per target revolution or less than 360° to achieve more than one period per target revolution. Further, the number of signal periods per target revolution can be the same for each of the target tracks 114a, 114c or can be different.

Target 110 includes at least two portions (referred to herein alternatively as tracks) and example target 110 of FIG. 1 includes three portions 114a-114c extending from a central hub 116. Target 110 can have a unitary construction (i.e., be formed from a single material structure). It will be appreciated however that target 110 could alternatively be formed from different material structures that are mechanically fixed together. Various materials are suitable for forming target 110, such as steel. Target 110 can be formed by various processes, such as stamping.

Sensor 120 can include a permanent magnet 130 disposed within or proximate to the sensor package in a so-called "back-biased" arrangement. In a back-biased arrangement, target 110 is ferromagnetic and sensor 120 experiences changes of magnetic field generated by the permanent magnet 130 as the target 110 rotates. It will be appreciated that, alternatively, target 110 can be a magnet that generates a magnetic field that varies as the target moves for detection by sensor 120, in which case the back-bias magnet 130 can be omitted. By way of one non-limiting example, target 110 can take the form of a so-called ring magnet having magnetic domains encoded by varying the polarization in order to generate the desired periodic magnetic field signals.

Figure 2C:
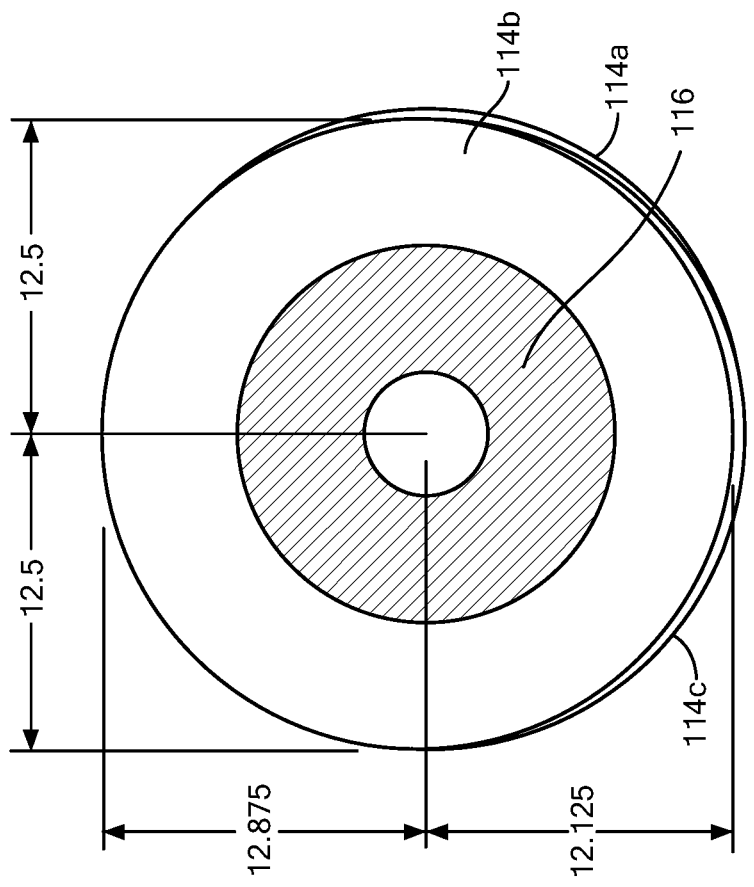
FIG. 2C is a cross-sectional view of the target of FIG. 2 taken along line C-C of FIG. 2.
Figure 5:
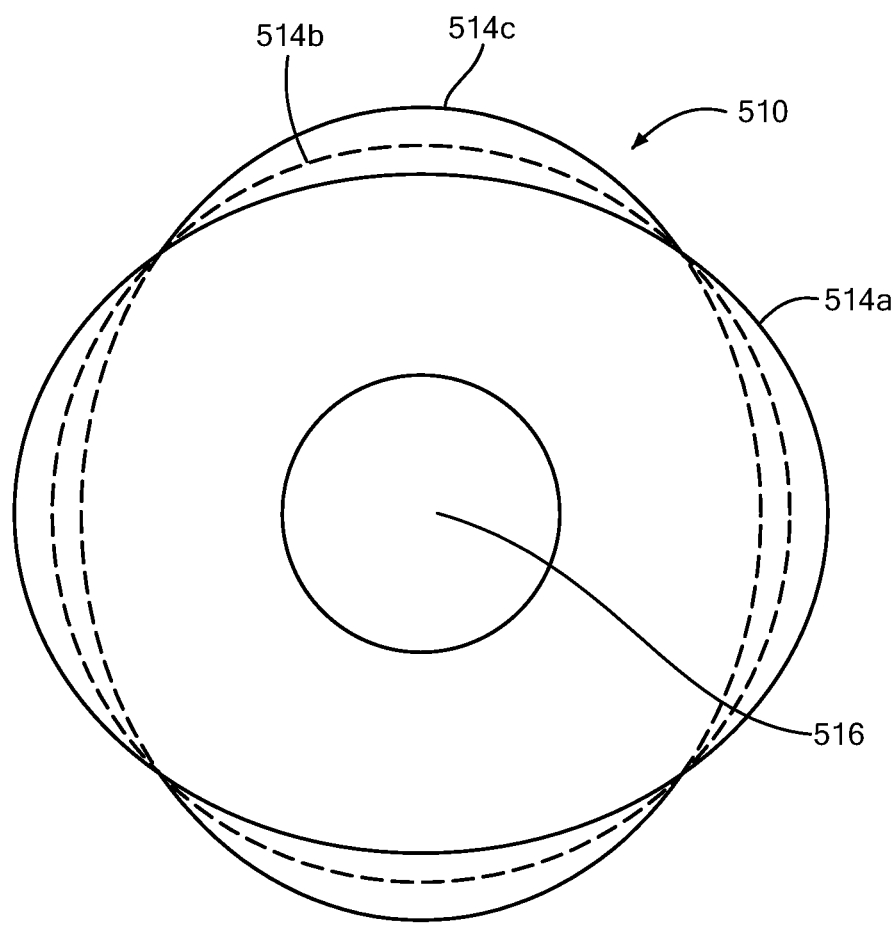
FIG. 5 is a side view of an alternative target having elliptical tracks that generate two magnetic field signal periods per revolution.

Target portions 114a and 114c can have various respective cross-sectional shapes designed to cause respective periodic magnetic field signals to be generated by the sensor 120 as target portions pass respective sensing elements, with such signals having a substantially constant phase separation. For example, referring also to the cross-sectional view of FIG. 2A taken along line A-A of FIG. 2, it can be seen that target track 114a has an oval shape. Similarly, it can be seen from the cross-sectional view of FIG. 2C taken along line C-C of FIG. 2 that target track 114c is also substantially oval. It will be appreciated that the illustrated target dimensions are examples only and can be varied to suit a particular application. It will also be appreciated that the oval shaped target portions can have a single axis of symmetry as shown in FIGS. 2-2C (i.e., to form an "egg shape" that is symmetrical about a single axis of symmetry) or two axes of symmetry as shown in FIG. 5 (i.e., to form an "ellipse shape"). In the example target 110 with tracks 114a, 114c each having a single axis of symmetry, the desired phase separation between the resulting magnetic field signals can be achieved by the axes of symmetry of the target tracks being offset with respect to each other by an angle corresponding to the desired phase separation. For example, in order to achieve a ninety degree phase separation between magnetic field signals, the axes of symmetry of the target tracks 114a, 114c can be offset from each other by ninety degrees.

The center target track 114b can be referred to as a reference portion and is configured to generate a constant reference potential in response to movement past sensing element 124b. In the example target 110, the center target track 114b is circular in order to thereby cause a constant reference voltage to be generated by the sensing element 124b proximate to such center track. In other words, the distance between the center track 114b and the respective sensing element 124b does not change as the target rotates.

Figure 2B:
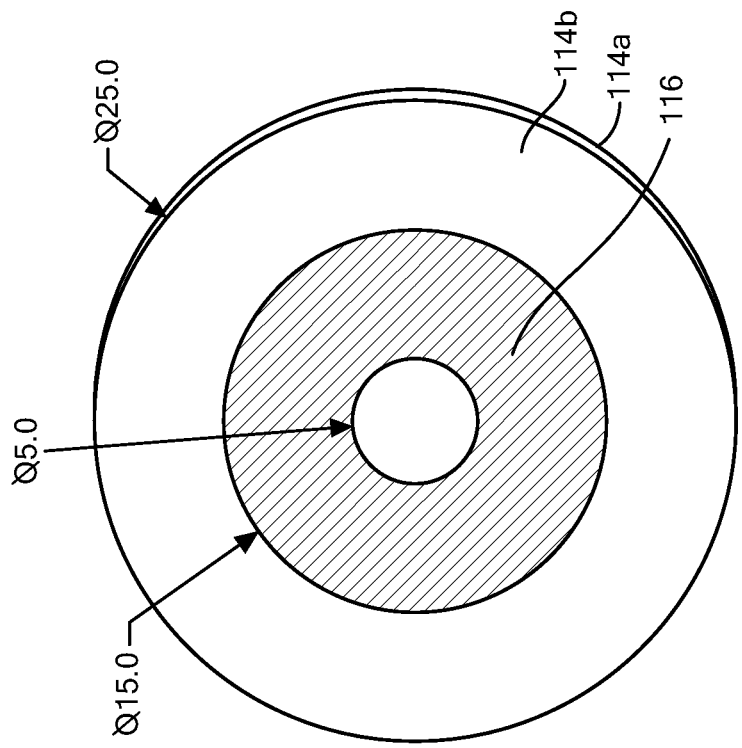
FIG. 2B is a cross-sectional view of the target of FIG. 2 taken along line B-B of FIG. 2.
Figure 3:
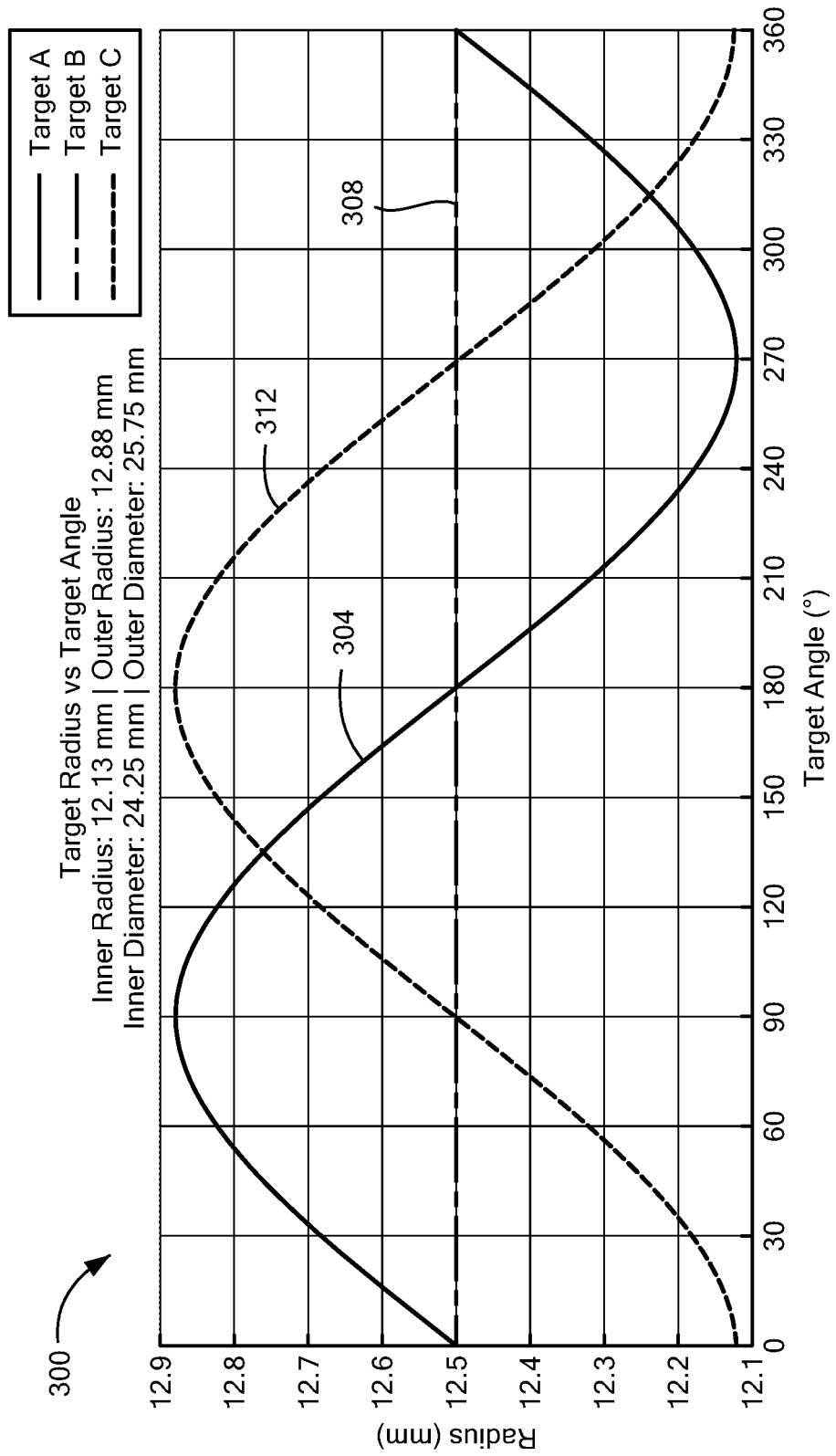
FIG. 3 is a graph showing example target radius versus target angle for the target of FIGS. 1 and 2.

Referring also to FIG. 3, for the example target 110 of FIGS. 1-2, a graph 300 illustrates target angle in units of degrees along the horizontal axis with respect to target radius in units of millimeters along the vertical axis. Waveforms 304, 308, 312 correspond to target portions, or tracks 114a, 114b, 114c, respectively. It will be appreciated that although tracks 114a, 114b, 114c are referred to as Target A, Target B, and Target C, respectively, in the legend of FIG. 3 for simplicity, such "target" designators (here and in connection with other figures) can, more specifically refer to tracks or portions of a target.

Figure 4:
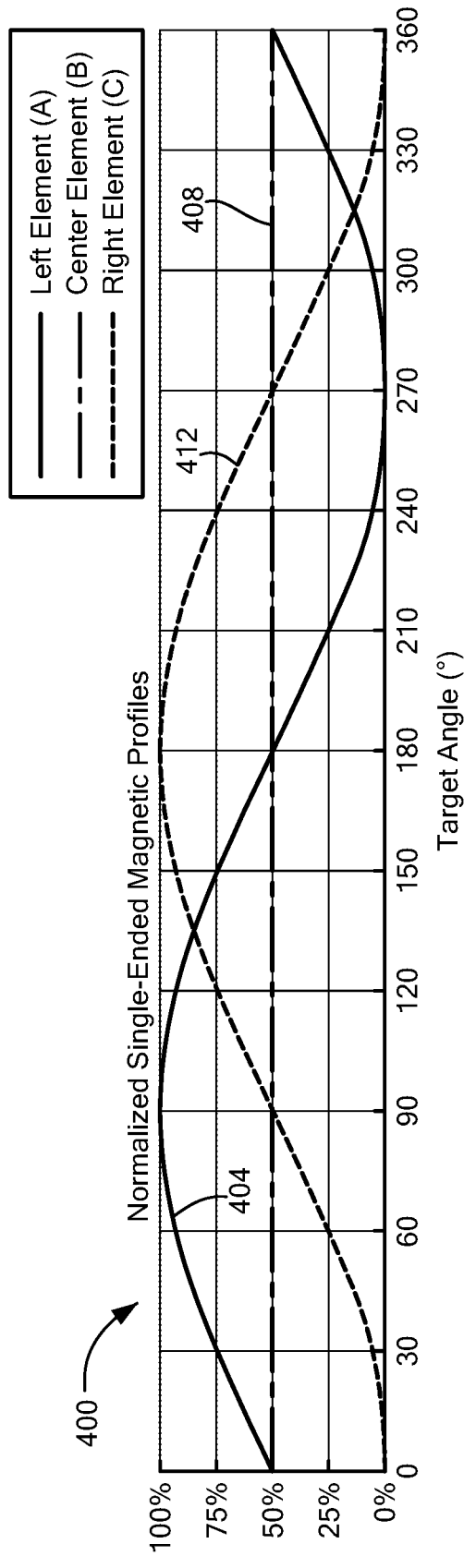
FIG. 4 is a graph showing example single-ended magnetic field signals from the sensing elements of the sensor of FIGS. 1 and 2.

The graph 400 of FIG. 4 illustrates target angle in units of degrees along the horizontal axis with respect to normalized magnetic profiles of the target tracks as 114a-114c as sensed by respective magnetic field sensing elements 124a-124c as a percentage along the vertical axis. Normalized magnetic profile waveforms 404, 408, 412 correspond to magnetic field sensed by sensing elements 124a, 124b, 124c, respectively. Thus, the nomenclature of the FIG. 4 legend refers to sensing element 124a as the Left Element (A), sensing element 124b as the Center Element (B), and sensing element 124c as the Right Element (C), with such "left" and "right" designators being arbitrary.

It will be appreciated that the magnetic field signals generated by sensing elements 124a, 124b, and 124c have the same general shape and other characteristics as magnetic profile waveforms 404, 408, 412. Thus, the periodic magnetic field signals generated by sensing elements 124a and 124c in response to rotation of target 110 can be substantially with sinusoidal, as shown. Other signal shapes are possible, such as a "sawtooth". And the magnetic field signal generated by sensing element 124b in response to rotation of target 110 can have a constant reference value, as shown.

Figure 4A:
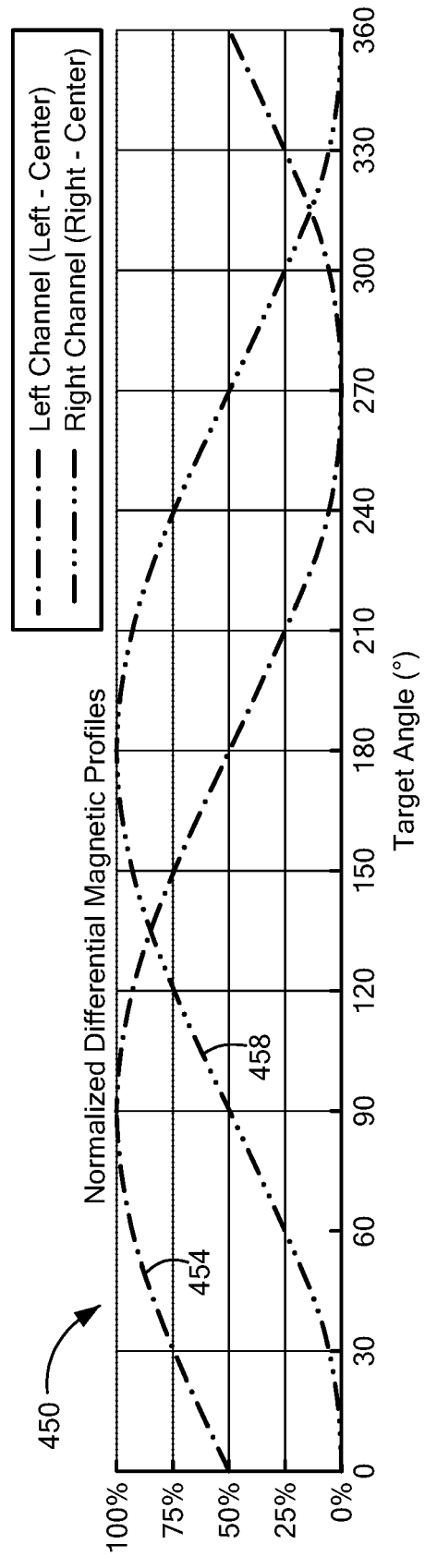
FIG. 4A is a graph showing example differential magnetic field signals from the sensing elements of the sensor of FIGS. 1 and 2.

Referring also to FIG. 4A, a graph 450 illustrates target angle in units of degrees along the horizontal axis with respect to normalized differential magnetic profiles as a percentage along the vertical axis for a sensor 120 implementing differential magnetic field sensing. As one example illustrated further in FIG. 6, a first differential magnetic profile or signal 454 can correspond to a difference between the magnetic fields sensed by the so-called left sensing element 124a and the center element 124b. A second differential magnetic profile or signal 458 can correspond to a difference between the magnetic fields sensed by the so-called right sensing element 124b and the center element 124b. Thus, the center sensing element 124b provides a "shared" common reference to generate the differential signals. Here again, it will be appreciated that the differential magnetic field signal generated by the difference between the signals from sensing elements 124a and 124b and the differential magnetic field signal generated by the difference between signals from sensing elements 124c and 124b have the same general shape and other characteristics as magnetic profile waveforms 454, 458 (thus waveforms 454, 458 may be referred to herein alternatively as first and second periodic magnetic field signals generated in response to movement of first and second respective target portions 114a, 114c). Waveform 454 may represent (or be functionally related to) a cosine function of the angular position of target 110 and waveform 458 may represent (or be functionally related to) a sine function of the angular position of target 110. Thus, the substantially constant phase separation between waveforms 454 and 458 can be ninety degrees.

Figure 4B:
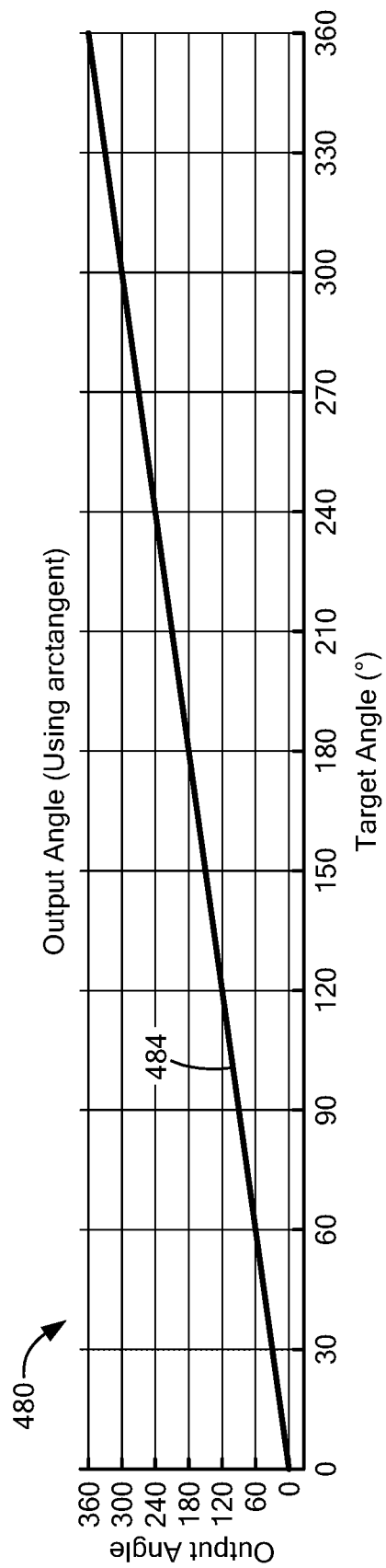
FIG. 4B is a graph showing an angle of rotation of the target generated based on the differential magnetic field signals of FIG. 4A.

In general, when signals 454, 458 are sinusoidal and in quadrature (i.e., have a ninety degree phase separation), the absolute target angle can be given by the arctangent of magnetic field signals 454, 458, such as may be computed using a CORDIC processor or a look-up table. FIG. 4B is a graph 480 illustrating the absolute angle 484 of the target 110 in degrees along the horizontal axis with respect to output angle of the sensor 120 in degrees along the vertical axis as computed based on the arctangent of differential magnetic field signals 454, 458 of FIG. 4A. In many position sensing systems, it can be challenging to achieve signals in perfect quadrature. According to the disclosure, substantially constant phase separation is achieved by the physical configuration of the target tracks and thus, design of the target track spacing can result in a phase separation between the resulting magnetic field signals of ninety degrees.

The absolute angle of rotation 484 of the target 110 can be computed "on-chip" by the sensor 120 or "off-chip" by an external controller or processor. Techniques other than arctangent computation for detecting target position (e.g., angle) are possible. For example, in embodiments in which the phase separation between the periodic magnetic field signals is not ninety degrees and/or in which the signals are not sinusoidal, look-up tables or other computational techniques can be used. As one of many examples, a three-phase system with one-hundred-twenty degree phase separation could be used with a look-up table or equation processing circuitry and/or techniques.

Consideration of signals 454, 458 demonstrates that the design of example target 110 results in a single period per target revolution. Stated differently, periodic signal 454 has a first repeating pattern and signal 458 has a second repeating pattern and in the embodiment of FIGS. 1-2, a first angle of repetition of the first repeating pattern and a second angle of repetition of the second repeating pattern is equal to 360°.

It will be appreciated that targets can be designed to provide more than one period per revolution. One such example is the target 510 of FIG. 5 in which the first and third tracks 514a, 514c have cross-sectional shapes that are substantially elliptical. In other respects, target 510 can be similar to target 110 and thus, can have a central hub 516 from which discrete tracks 514a, 514b, and 514c extend. Thus, the view of FIG. 5 is a side view rendering the central track 514b and track 514c partially hidden (so shown in phantom). It will be appreciated that placement of sensor 120 proximate to target 510 results in magnetic field signals having twice the frequency as signals 454, 458. Targets like target 510 that provide more than one period per revolution can result in enhanced position detection resolution; however, in such embodiments additional circuitry and/or techniques are required to determine absolute target position. For example, detection of an angle of ten degrees with target 510 could mean that the target is at an absolute angular position of ten degrees or one-hundred-ninety degrees. Use of a turns counter or target index feature or an additional sensor could be used in such embodiments to determine the absolute position.

In the illustrated target embodiments such as targets 110, 510, the number of periods of each track 114a, 114c are the same (i.e., an angle of repetition of the first repeating pattern is the same as an angle of repetition of the second repeating pattern). It is possible however, to provide different tracks of a target with different numbers of periods per target revolution.

Figure 18:
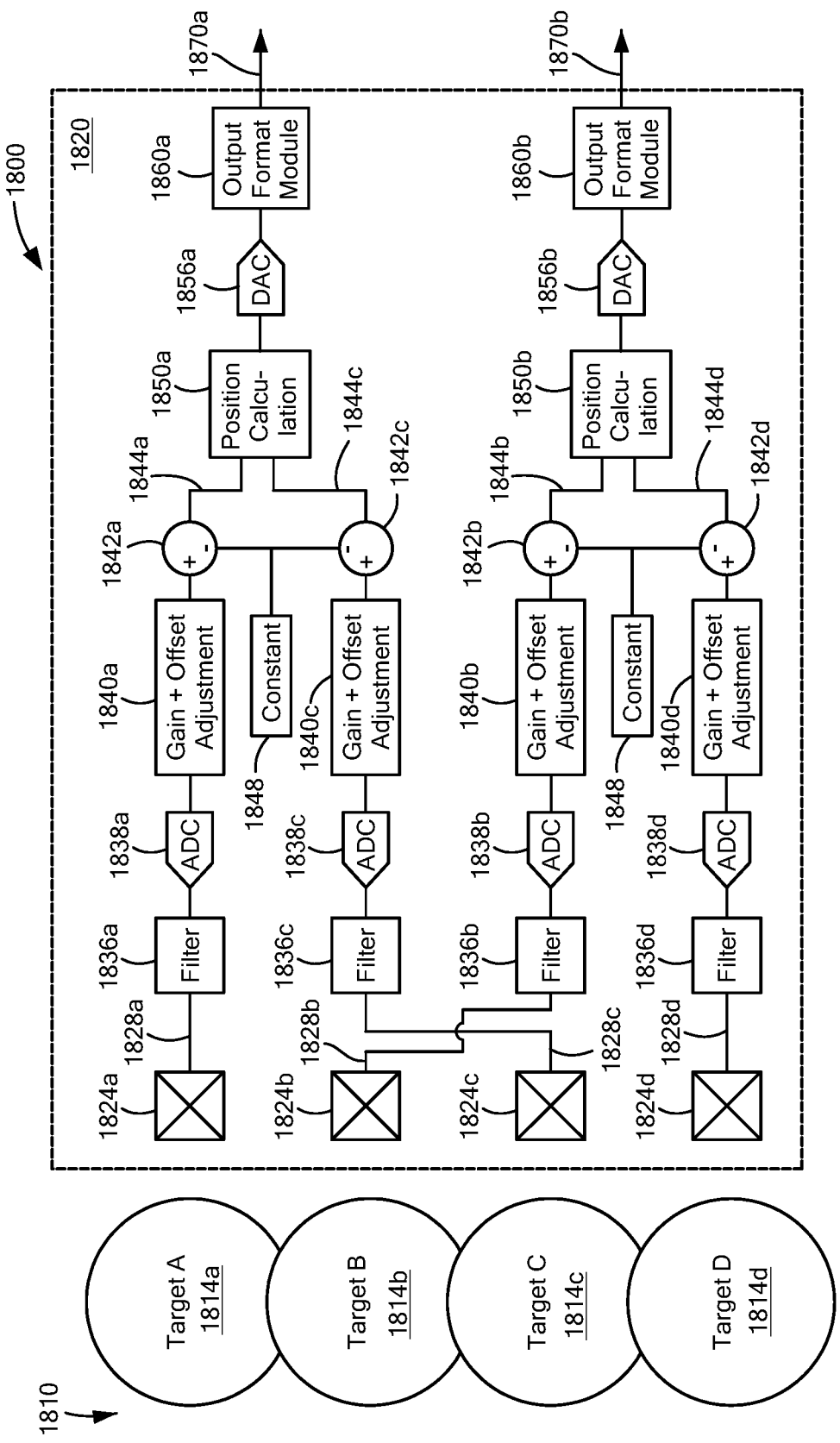
FIG. 18 is a block diagram of another example magnetic field sensor proximate to a target, which sensor generates overlapping magnetic field signals.

Referring to FIGS. 6-9, example sensors 620-920 illustrate generation of two or more periodic magnetic field signals in response to movement of a target that can take the form of target 110 for example. It will be appreciated however, that sensors 620-920 can also be used in connection with other targets, such as those described below with modification in some instances (for example to accommodate more or fewer target tracks) as will become apparent. FIG. 10 illustrates a sensor 1020 for use with an example target 1010 (FIG. 10A) having four tracks, FIG. 11 illustrates a sensor 1120 for use with an example target 1110 (FIG. 11A) having two tracks, FIG. 12 illustrates a sensor 1220 for use with a two track target, but having four sensing elements for redundant sensing, and FIG. 18 illustrates a sensor 1820 for use with a four track target, using overlapping elements to generate the magnetic field signals. As will be appreciated, the sensors described herein (e.g., sensors 120, 620, 720, 820, 920, 1020, 1120, 1220, 1820) illustrate various signal generation and processing aspects, features, and techniques that can be used in combinations beyond those examples shown.

Advantageously, sensors described herein (e.g., sensors 120, 620, 720, 820, 920, 1020, 1120, 1220, 1820) can detect the absolute position promptly following sensor power up (i.e., once sufficient power is supplied to the sensor and any initialization and/or propagation delays have occurred), before the target begins to rotate or otherwise move. This is in contrast to magnetic field sensors that require some number of target revolutions (or other target movement) before position can be detected.

In embodiments, sensors described herein can be provided in the form of an integrated circuit (IC) containing one or more semiconductor die. Integration of sensor components in a single IC package and on a single semiconductor die can facilitate precision in the positioning of the magnetic field sensing elements with respect to each other. Other sensor forms are also possible such as using discrete components on a printed circuit board or other substrate.

Figure 6:
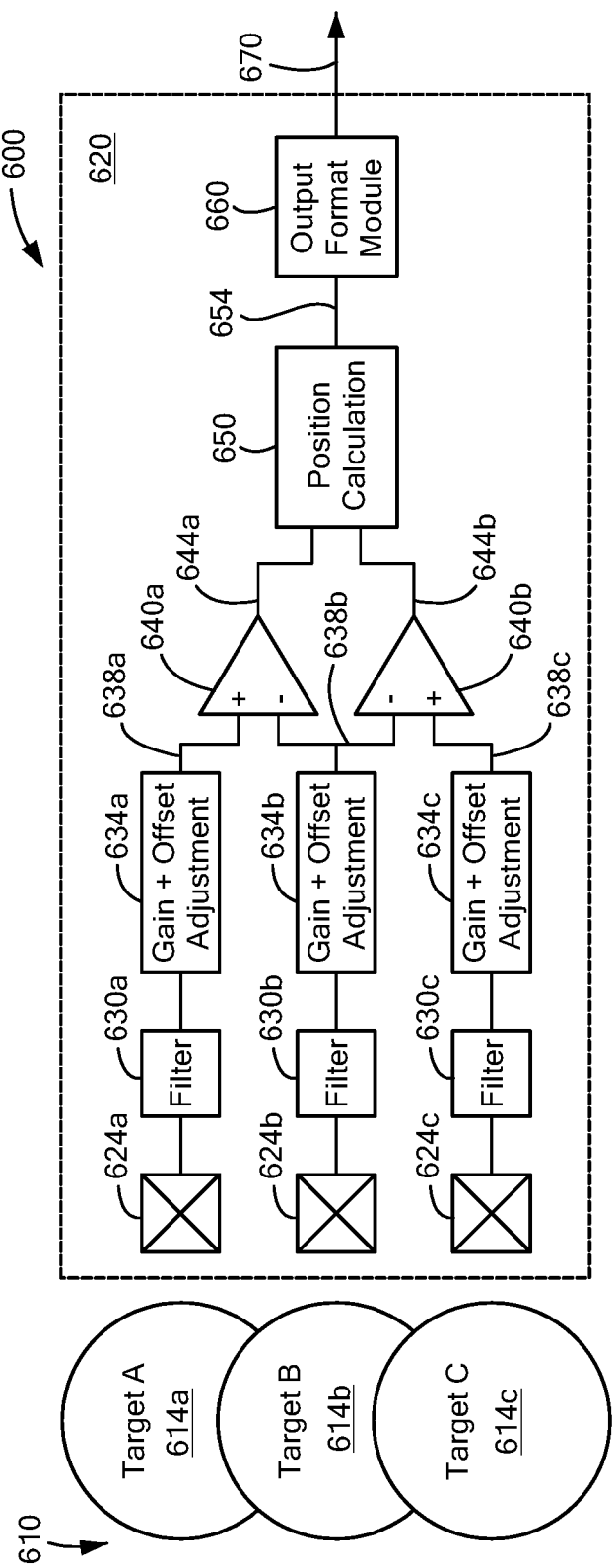
FIG. 6 is a block diagram of an example magnetic field sensor proximate to the target of FIGS. 1 and 2, which sensor implements analog processing to generate a sensor output signal indicative of the absolute position of the target, with signal conditioning before differential signal generation.

Referring to FIG. 6, position sensing system 600 includes a sensor 620 proximate to target 610. Target 610 can be the same as or substantially similar to target 110 (FIGS. 1-2C) and thus, can include three tracks 614a, 614b, 614c, with track 614b providing a constant reference.

Sensor 620 implements analog processing to generate a sensor output signal 670 indicative of the absolute position of the target 610, with analog signal conditioning before differential signal generation. Sensor 620 includes a first magnetic field sensing element 624a disposed proximate to the first target track 614a, a second magnetic field sensing element 624b disposed proximate to the second target track 614b, and a third magnetic field sensing element 624c disposed proximate to the third target track 614c. Each sensing element 624a-624c generates a respective sensing element output signal that can be filtered by a respective filter 630a-630c. Gain and/or offset adjustment can be applied to the filtered signals by gain and offset adjustment circuits 634a-634c.

The output signals 638a-638c from gain and offset adjustment circuits 634a-634c can be coupled to inputs of amplifiers 640a and 640b as shown in order to generate differential magnetic field signals 644a, 644b, as shown. Signal 644a can correspond to the difference between signal 638a and signal 638b and signal 644b can correspond to the difference between signal 638c and signal 638b. Signal 638b can provide a constant reference potential for generating differential magnetic field signals 644a, 644b. While the use of differential signals can improve stray field immunity, it will be appreciated that single-ended signals could alternatively be used.

Signals 644a, 644b are periodic magnetic field signals having a substantially constant phase separation established by the distance between the target tracks 614a-614c. For example, signals 644a, 644b can be the same as or similar to signals 454, 458 of FIG. 4A and thus, can be generally sinusoidal signals having a ninety degree phase separation.

Position calculation unit 650 is coupled to receive signals 644a, 644b and can be configured to determine the absolute position of the target 610, such as the angular position of a shaft to which the target is attached for example. To this end, position calculation unit 650 can take the form of a CORDIC processor or look-up table configured to generate an output signal 654 having a value indicative of the absolute position (e.g., angle of rotation) of the target 610.

An output format module 660 is coupled to receive the position signal 654 and configured to generate an output signal 670 of the magnetic field sensor that is indicative of absolute position of the target (e.g., rotational angle). In some embodiments, the sensor output signal 670 can include additional information such as target speed and/or direction of target motion (see, e.g., FIG. 9).

Output format module 660 can provide output signal 670 in various formats based on the application including, but not limited to, SPI (serial peripheral interface), PWM (pulse width modulation), I²C, A/B/I format, and SENT (Single Edge Nibble Transmission). The sensor output signal 670 can be coupled to external circuits and/or systems that further process the position information. For example, speed of motion of the target can be calculated based on the angle signal over time (i.e., change in angle over change in time).

Figure 7:
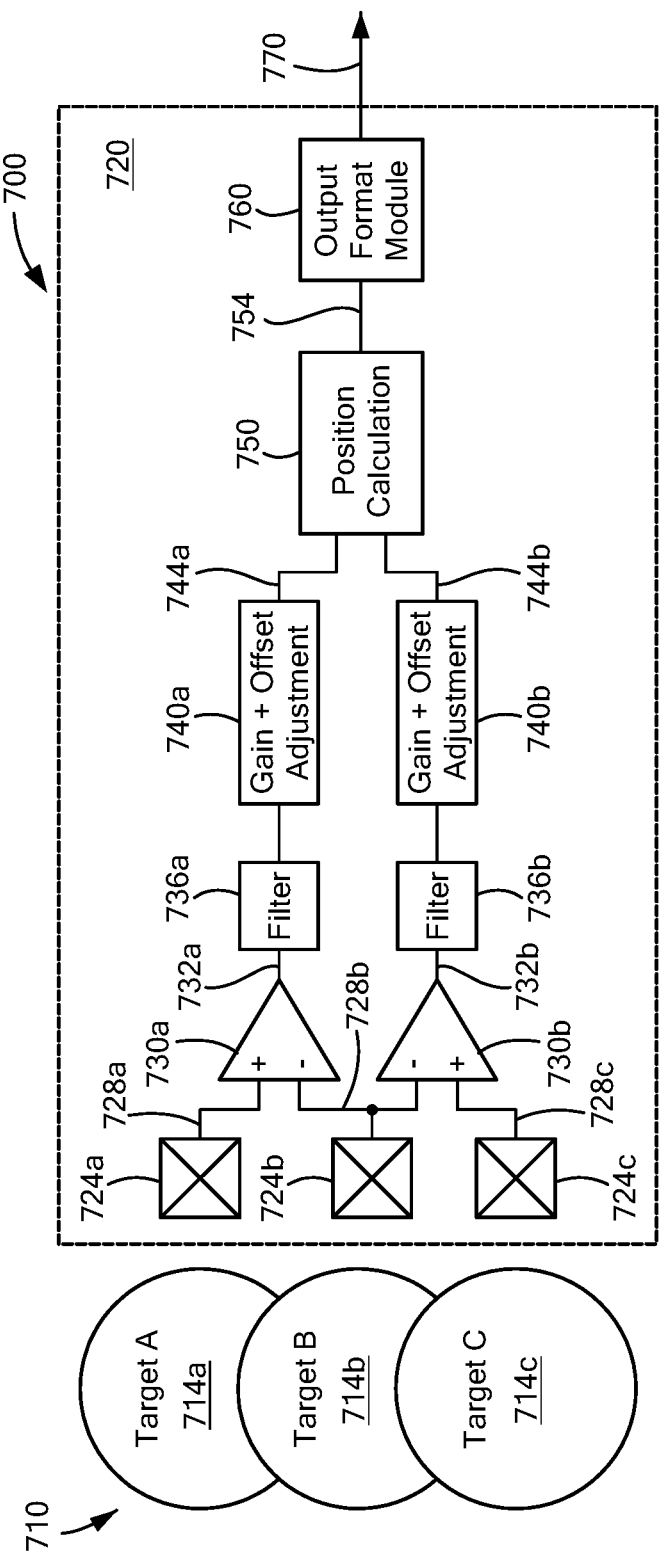
FIG. 7 is a block diagram of another example magnetic field sensor proximate to the target of FIGS. 1 and 2, which sensor implements analog processing to generate a sensor output signal indicative of the absolute position of the target, with signal conditioning after differential signal generation.

Referring to FIG. 7, position sensing system 700 includes a sensor 720 proximate to a target 710 that can be the same as or similar to target 110 and thus, can include three tracks 714a, 714b, 714c, with track 714b providing a constant reference.

Sensor 720 implements analog processing to generate a sensor output signal 770 indicative of the absolute position of the target 710, but differs from sensor 620 (FIG. 6) in that signal conditioning occurs after differential signal generation. Sensor 720 includes a first magnetic field sensing element 724a disposed proximate to the first target track 714a, a second magnetic field sensing element 724b disposed proximate to the second target track 714b, and a third magnetic field sensing element 724c disposed proximate to the third target track 714c. Each sensing element 724a-724c generates a respective sensing element output signal 728a-728c. Amplifiers 730a, 730b are coupled to receive sensing elements output signals 728a-728c in order to generate differential signals 732a, 732b as shown, with signal 732a corresponding to the difference between signal 728a and signal 728b and signal 732b corresponding to the difference between signal 728c and signal 728b. Signal 728b can provide a constant reference potential.

Differential magnetic field signals 732a, 732b are periodic magnetic field signals having a substantially constant phase separation established by the distance between the target tracks 714a-714c. For example, signals 732a, 732b can be the same as or similar to signals 454, 458 of FIG. 4A and thus, can be generally sinusoidal signals having a ninety degree phase separation.

Filters 736a, 736b can be coupled to receive the differential signals 732a, 732b as shown and gain and/or offset adjustment can be applied to the filtered signals by gain and offset adjustment circuits 740a, 740b.

The output signals from gain and offset adjustment circuits 740a, 740b can be coupled to a position calculation unit 750 that can be the same as or similar to position calculation unit 650 (FIG. 6). Position calculation unit 750 can be configured to determine the absolute position of the target, such as the angular position of a shaft to which the target is attached for example, and generate a position signal 754 accordingly. An output format module 760 is coupled to receive the position signal 754 and generate an output signal 770 of the magnetic field sensor in a format selected to suit the sensor application.

Figure 8:
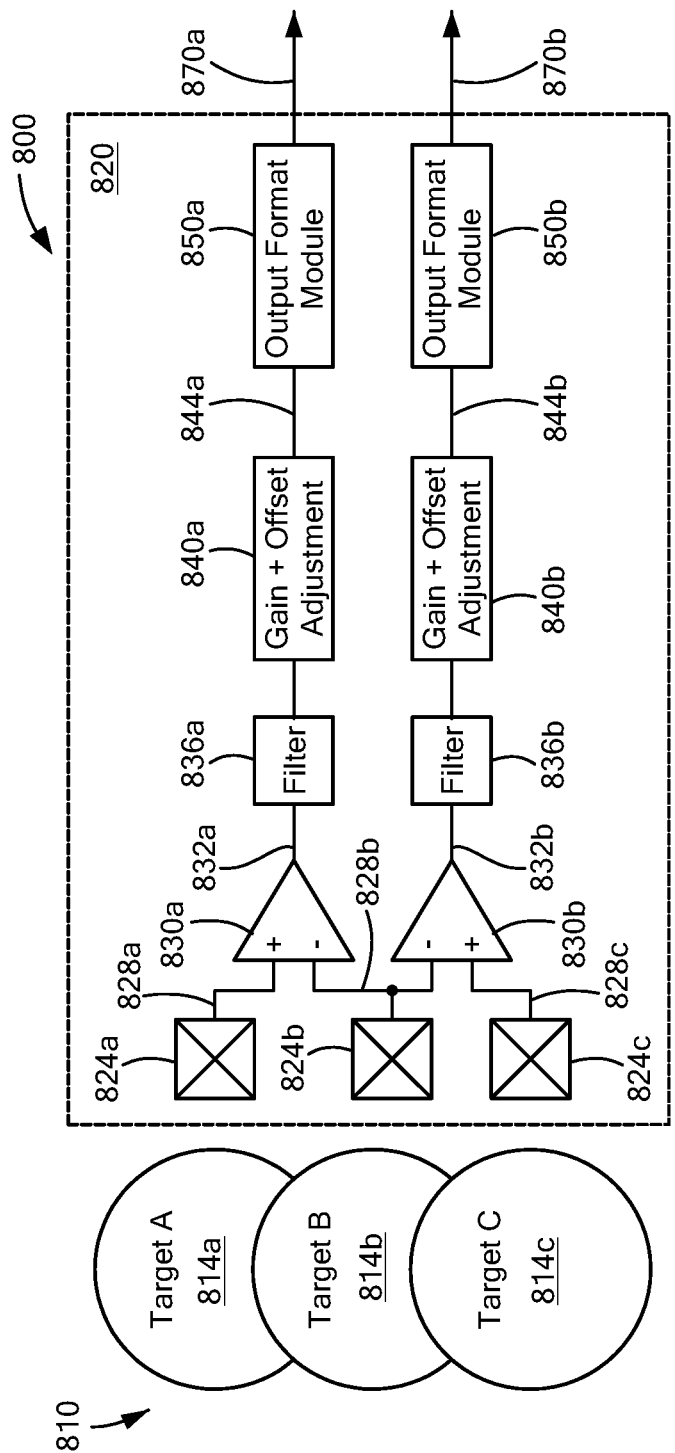
FIG. 8 is a block diagram of another example magnetic field sensor proximate to the target of FIGS. 1 and 2, which sensor implements analog processing to output the magnetic field signals.

Referring to FIG. 8, position sensing system 800 includes a sensor 820 proximate to a target 810 that can be the same as or similar to target 110 and thus, can include three tracks 814a, 814b, 814c, with track 814b providing a constant reference.

Sensor 820 implements analog processing to generate a sensor output signal indicative of the absolute position of the target 810 in a manner generally similar to sensor 720 (FIG. 7) with signal conditioning occurring after differential signal generation. Sensor 820 differs from sensor 720 (and from sensor 620) in that the sensor output includes periodic, phase separated signals 870a, 870b, which signals can be used by external systems (e.g., an external processor or controller) to compute the absolute target position.

Sensor 820 includes a first magnetic field sensing element 824a disposed proximate to the first target track 814a, a second magnetic field sensing element 824b disposed proximate to the second target track 814b, and a third magnetic field sensing element 824c disposed proximate to the third target track 814c. Each sensing element 824a-824c generates a respective sensing element output signal 828a-828c. Amplifiers 830a, 830b are coupled to receive sensing elements output signals 828a-828c in order to generate differential signals 832a, 832b as shown, with signal 832a corresponding to the difference between signal 828a and signal 828b and signal 832b corresponding to the difference between signal 828c and signal 828b. Signal 828b can provide a constant reference potential.

Differential magnetic field signals 832a, 832b are periodic magnetic field signals having a substantially constant phase separation established by the distance between the target tracks 814a-814c. For example, signals 832a, 832b can be the same as or similar to signals 454, 458 of FIG. 4A and thus, can be generally sinusoidal signals having a ninety degree phase separation.

Filters 836a, 836b can be coupled to receive the differential signals 832a, 832b as shown and gain and/or offset adjustment can be applied to the filtered signals by gain and offset adjustment circuits 840a, 840b.

The output signals 844a, 844b, from gain and offset adjustment circuits 840a, 840b can be coupled to respective output format modules 860a, 860b which are configured to generate respective sensor output signal 870a, 870b in a format selected to suit the sensor application.

Figure 9:
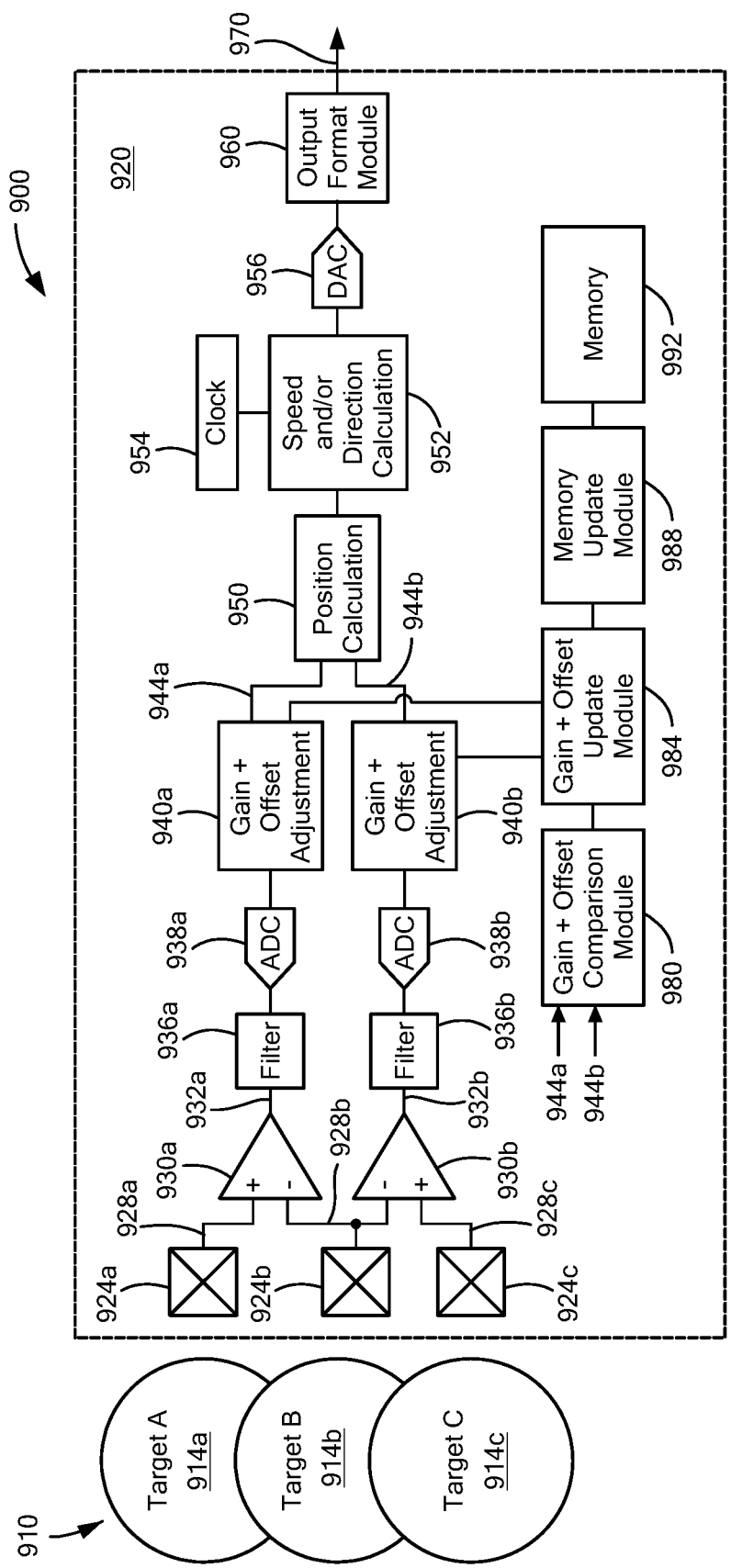
FIG. 9 is a block diagram of another example magnetic field sensor proximate to the target of FIGS. 1 and 2, which sensor implements digital processing to generate a sensor output signal indicative of the absolute position of the target, speed and direction of motion of the target, and including a calibration feedback loop.
Figure 10:
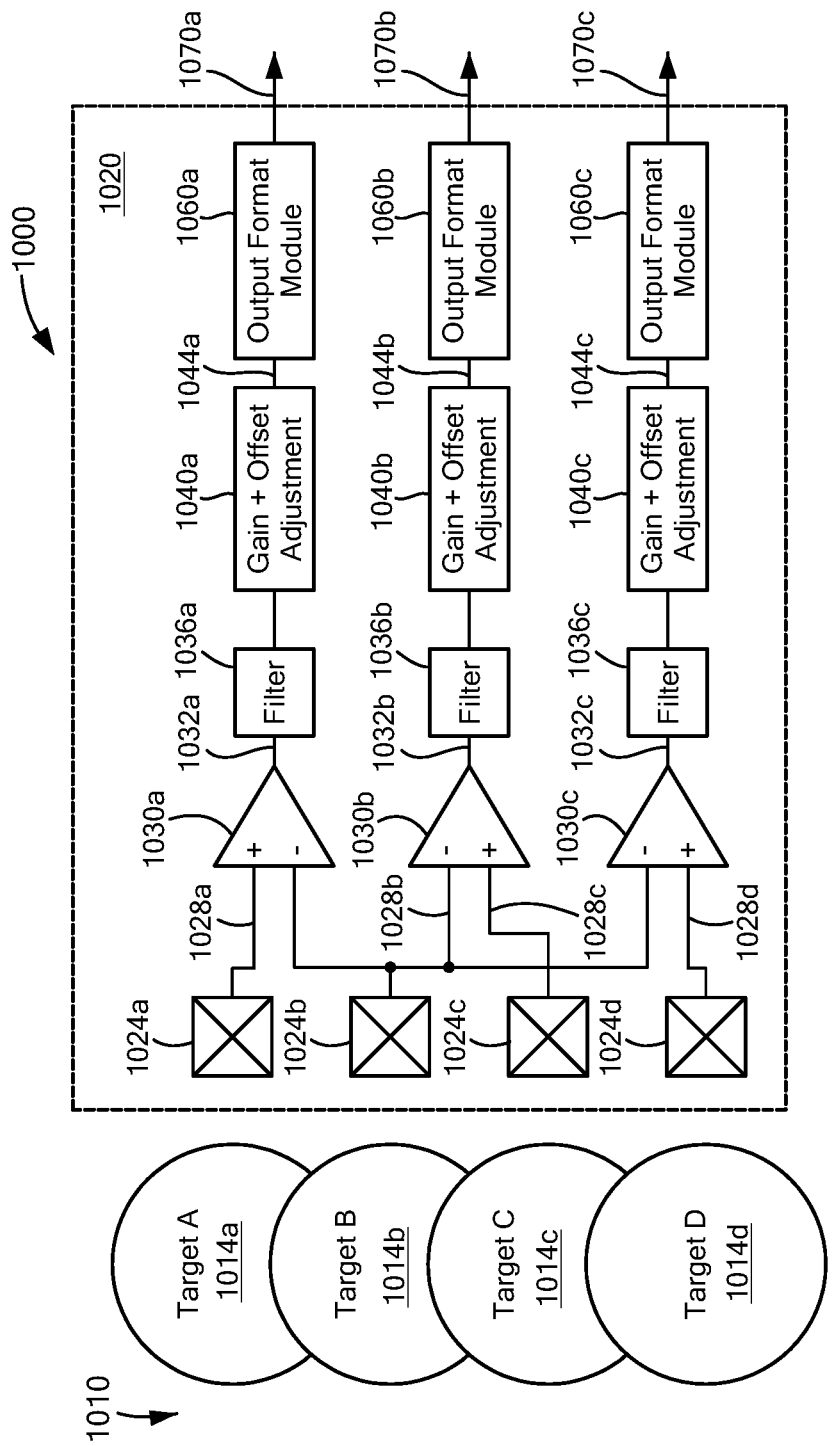
FIG. 10 is a block diagram of another example magnetic field sensor proximate to an alternative target, which sensor implements analog processing to output three magnetic field signals.

Referring to FIG. 9, position sensing system 900 includes a sensor 920 proximate to target 910 that can be the same as or similar to target 110 and thus, can include three tracks 914a, 914b, 914c, with track 914b providing a constant reference.

Sensor 920 implements digital processing to generate a sensor output signal 970 indicative of the absolute position of the target 910 with signal conditioning occurring after differential signal generation. Sensor 920 differs from sensors 620, 720, and 820 in that a portion of the signal processing path is digital. Also, sensor 920 can implement speed detection to determine a speed of motion of target 910, direction detection to determine a direction of motion of target 910, and includes a calibration feedback loop including a gain and offset comparison module 980, a gain and offset update module 984, a memory update module 988, and a memory 992.

Sensor 920 includes a first magnetic field sensing element 924a disposed proximate to the first target track 914a, a second magnetic field sensing element 924b disposed proximate to the second target track 914b, and a third magnetic field sensing element 924c disposed proximate to the third target track 914c. Each sensing element 924a-924c generates a respective sensing element output signal 928a-928c. Amplifiers 930a, 930b are coupled to receive sensing elements output signals 928a-928c in order to generate differential signals 932a, 932b as shown, with signal 932a corresponding to the difference between signal 928a and signal 928b and signal 932b corresponding to the difference between signal 928c and signal 928b. Signal 928b can provide a constant reference potential.

Differential magnetic field signals 932a, 932b are periodic magnetic field signals having a substantially constant phase separation established by the distance between the target tracks 914a-914c. For example, signals 932a, 932b can be the same as or similar to signals 454, 458 of FIG. 4A and thus, can be generally sinusoidal signals having a ninety degree phase separation.

Filters 936a, 936b can be coupled to receive the differential signals 932a, 932b as shown. Digital signal processing can be implemented by converting the filtered analog signals into digital signals with analog-to-digital converters (ADCs) 938a, 938b, respectively. Gain and/or offset adjustment thus can be applied in the digital domain by gain and offset adjustment circuits 940a, 940b.

Processed magnetic field signals 944a, 944b at the output of gain and offset adjustment circuits 940a, 940b can be coupled to position calculation unit 950 for calculation of the target position (e.g., calculation of the target angle by arctangent processing). The output signal of the position calculation unit 950 can have a value indicative of the absolute position (e.g., angle of rotation) of the target 910.

In the embodiment of FIG. 9, speed of motion and/or direction of motion of the target can be calculated by a speed and/or direction calculation unit 952. Various circuitry and methodologies are possible for determining the speed of motion of the target 910. As one example, the speed calculation unit 952 can calculate a change in angle over a change in time (which time can be synchronized to a clock signal from a clock circuit 954). Direction can be calculated by storing the detected absolute target position and comparing a subsequently detected target position calculation to a stored previous value in order to determine if the position is incrementing (i.e., moving in a first direction) or decrementing (i.e., moving in a second direction) and updating a direction bit accordingly. Direction can be determined in this manner periodically at a fixed periodicity or when the position is determined to have changed by more than a predetermined amount (e.g., more than a half degree). Hysteresis can be applied to the direction determination in order to prevent dithering of the direction bit when the target is stationary. It will be appreciated that other methodologies for detecting speed and/or direction are also possible. For example, a peak detector can detect positive and negative peaks of one or both of the signals 944a, 944b and the detected peaks can be compared to a threshold to generate comparison signals. A frequency of transitions of the comparison signal can be indicative of speed of motion of the target and a phase relationship between such comparison signals can be used to determine direction.

The output of speed and/or direction calculation unit 952 can thus be indicative of the angle of rotation of the target 910, the speed of rotation of the target and/or the direction of rotation of the target. A digital-to-analog converter (DAC) 956 can convert the speed, direction, and position signal into an analog signal for formatting by output format module 960 to generate an output signal 970 of the magnetic field sensor.

The calibration feedback loop including gain and offset comparison module 980, gain and offset update module 984, memory update module 988, and memory 992 is configured to compensate, or calibrate for offset and gain changes due to airgap changes and installation tolerances. Ideally, once a sensor is installed in the application system proximate to the target, the distance between the sensing elements and target (i.e., the airgap) remains fixed. Some conditions however can cause the airgap to change (e.g., lifetime wear or jostling of the system). A change in airgap could affect the gain of periodic magnetic field signals 944a, 944b.

In operation, initial gain and offset values of signals 944a, 944b can be determined and stored in memory 992. More specifically, a gain value can be determined by measuring the peak-to-peak value of the signals 944a, 944b and an offset value can be determined by comparing (e.g., with comparison module 980) the level of signals 944a, 944b to the measured peak-to-peak value.

Subsequently, during operation, the gain and offset values of signals 944a, 944b can be periodically monitored and compared by comparison module 980 to the respective stored initial values. If a change of a predetermined amount has occurred in the gain and/or offset, then gain and/or offset adjustment values can be determined by gain and offset update module 984 based on the comparison and applied to the magnetic field signals by modules 940*a*, 940*b*. Such new gain and offset values can then be stored in memory update module 988.

When the sensor 920 is next turned on or reset, the previously stored gain and offset values are presumed to be optimized for the sensor airgap and can be loaded into the gain and offset adjustment modules 940*a*, 940*b* for use.

Referring to FIG. 10, position sensing system 1000 includes a sensor 1020 proximate to target 1010. Target 1010 has four portions or tracks 1014*a*-1014*d*, each proximate to a respective sensing element 1024*a*-1024*b* of sensor 1020. Track 1014*b* provides a constant reference for use in generating differential signals based on the other tracks 1014*a*, 1014*b*, 1014*d*. Thus track 1014*b* can have a circular cross-sectional shape like track 114*b* (FIGS. 2B-2C).

Differential magnetic field signals are generated by coupling the outputs of pairs of sensing elements to amplifiers 1030*a*-1030*c* as shown. In particular, output signals 1028*a* of element 1024*a* and 1028*b* of element 1024*b* are coupled to inputs of amplifier 1030*a*, output signals 1028*b* of element 1024*b* and 1028*c* of element 1024*c* are coupled to inputs of amplifier 1030*b*, and output signals 1028*b* of element 1024*b* and 1028*d* of element 1024*d* are coupled to inputs of amplifier 1030*c*. Thus, in this configuration, sensing element 1024*b* is a shared element used to generate a common reference (i.e., in the manner of shared sensing element 124*b* of FIG. 1).

Differential magnetic field signals 1032*a*, 1032*b*, 1032*c* are periodic magnetic field signals having a substantially constant phase separation established by the distance between the target tracks 1014*a*-1014*d*. As one example, signals 1032*a*, 1032*b*, 1032*c* can be generally sinusoidal signals having a phase separation of one-hundred-twenty degrees.

Filters 1036*a*-1036*c* can be coupled to receive the differential signals 1032*a*-1032*c* as shown and gain and/or offset adjustment can be applied to the filtered signals by gain and offset adjustment circuits 1040*a*-1040*c*.

The output signals 1044*a*-1044*c* from gain and offset adjustment circuits 1040*a*-1040*c* can be coupled to respective output format modules 1060*a*-1060*c* which are configured to generate respective sensor output signals 1070*a*-1070*c* in a format selected to suit the sensor application, which signals can be used by external systems (e.g., an external processor or controller) to compute the absolute target position.

Figure 10A:
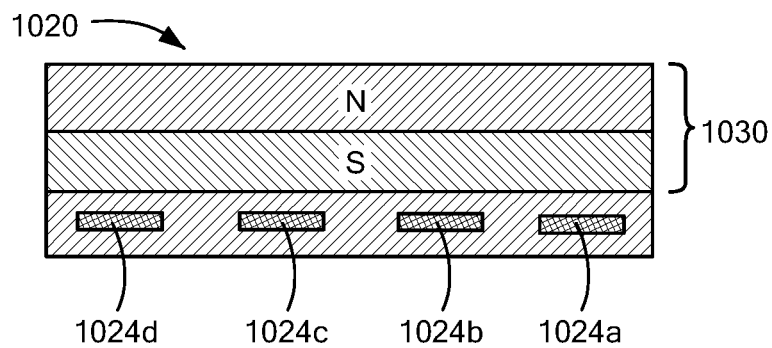
FIG. 10A is a simplified cross-sectional view of an example magnetic field sensor of FIG. 10 having four sensing elements in an in-line configuration.
Figure 10B:
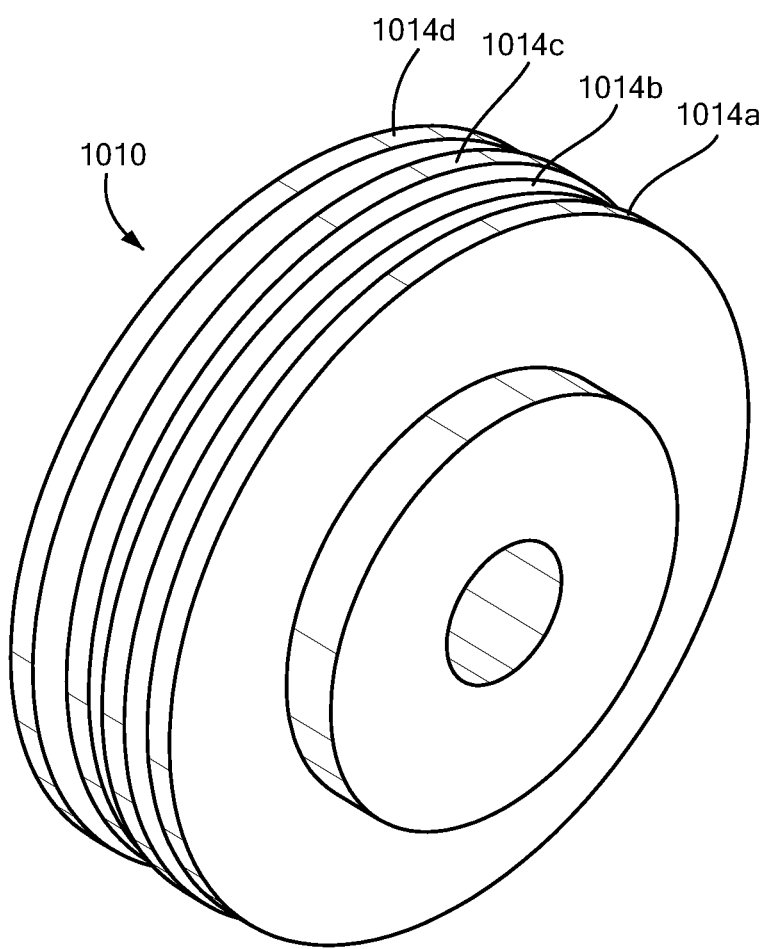
FIG. 10B is a perspective view of an example target of FIG. 10.
Figure 11:
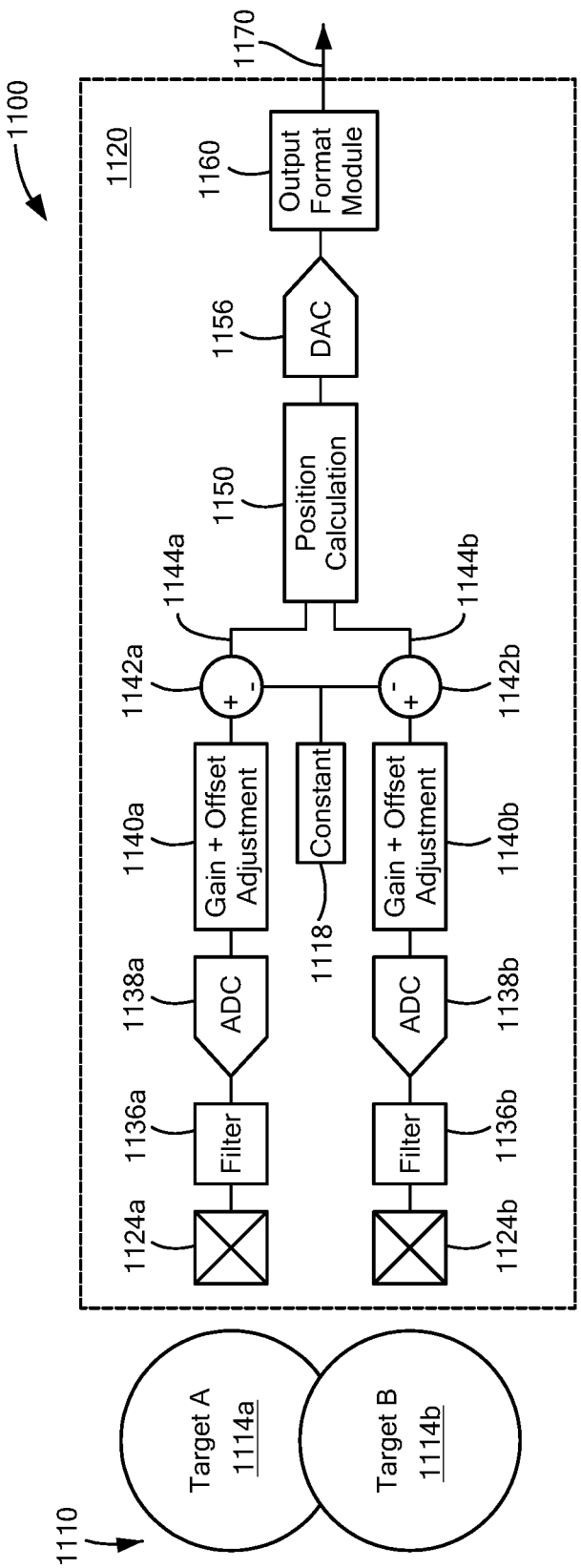
FIG. 11 is a block diagram of another example magnetic field sensor proximate to an alternative target that does not have a central reference portion.

FIG. 10A is a simplified cross-sectional view of sensor 1020 in a package with a back-bias magnet 1030 and FIG. 10B illustrates an example target 1010 having tracks 1014*a*-1014*b*. In use, sensor 1020 is installed in the system 1000 such that "in-line" sensing elements 1024*a*-1024*d* are positioned adjacent to respective target tracks 1014*a*-1014*d*.

It will be appreciated that while output signals 1028*a*-1028*d* of sensing elements 1024*a*-1024*d* are coupled as shown, other couplings of the sensing element output signals are possible. In general, use of four sensing elements 1024*a*-1024*d* generating four respective output signals 1028*a*-1028*d* can generate six unique differential signals, some of which are formed from signals from adjacent sensing element pairs and some of which are formed from non-adjacent sensing element pairs (i.e., in an overlapping configuration) as follows: 1028*a*-1028*b*, 1028*a*-1028*c*, 1028*a*-1028*d*, 1028*b*-1028*c*, 1028*b*-1028*d*, and 1028*c*-1028*d*. By generating one or more differential signals using non-adjacent elements (e.g., signal 1032*c* generated using elements 1014*b*, 1014*d*), larger differential signals can be provided than otherwise possible. Further, by generating more differential signals (e.g., three signals as shown in FIG. 10, rather than fewer), flexibility in the physical design of the target and selection of differential pairs and/or signal redundancy can be achieved.

Referring to FIG. 11, position sensing system 1100 includes a sensor 1120 proximate to a target 1110. Target 1110 has two portions or tracks 1114*a*, 1114*b*, each proximate to a respective sensing element 1124*a*, 1124*b* of sensor 1120. In order to implement differential sensing, rather than having a target track provided the constant reference (i.e., central reference track 114*b* of FIG. 1), a reference potential 1118 is used to generate the differential magnetic field signals.

Each of the sensing elements 1124*a*, 1124*b* can be coupled to a respective filter 1136*a*, 1136*b* and the resulting filtered signals can be converted into digital signals by respective ADCs 1138*a*, 1138*b*. Gain and offset adjustment can be implemented by circuits 1140*a*, 1140*b*.

Summation elements 1142*a*, 1142*b* are coupled to generate differential magnetic field signals 1144*a*, 1144*b*, respectively, by taking a difference between the output signals of gain and offset adjustment circuits 1140*a*, 1140*b* and the constant reference potential 1148, as shown. In this way, differential sensing is implemented using an electronic reference 1148 (as may be provided by a ground or other fixed sensor potential that may be preset or programmed) rather than requiring an additional reference target portion (e.g., track 114*b*). The resulting magnetic field signals 1144*a*, 1144*b* are periodic magnetic field signals having a substantially constant phase separation established by the distance between the target tracks 1114*a* and 1114*b*. For example, signals 1144*a*, 1144*b* can be generally sinusoidal signals having a ninety degree phase separation.

Position calculation unit 1150 can be configured to determine the absolute position of the target 1110, such as the angular position of a shaft to which the target is attached for example and generate a position signal accordingly. DAC 1156 converts the position signal into an analog signal for further processing by output format module 1160 to generate an output signal 1170 of the magnetic field sensor 1120 in a format selected to suit the sensor application.

Figure 11A:
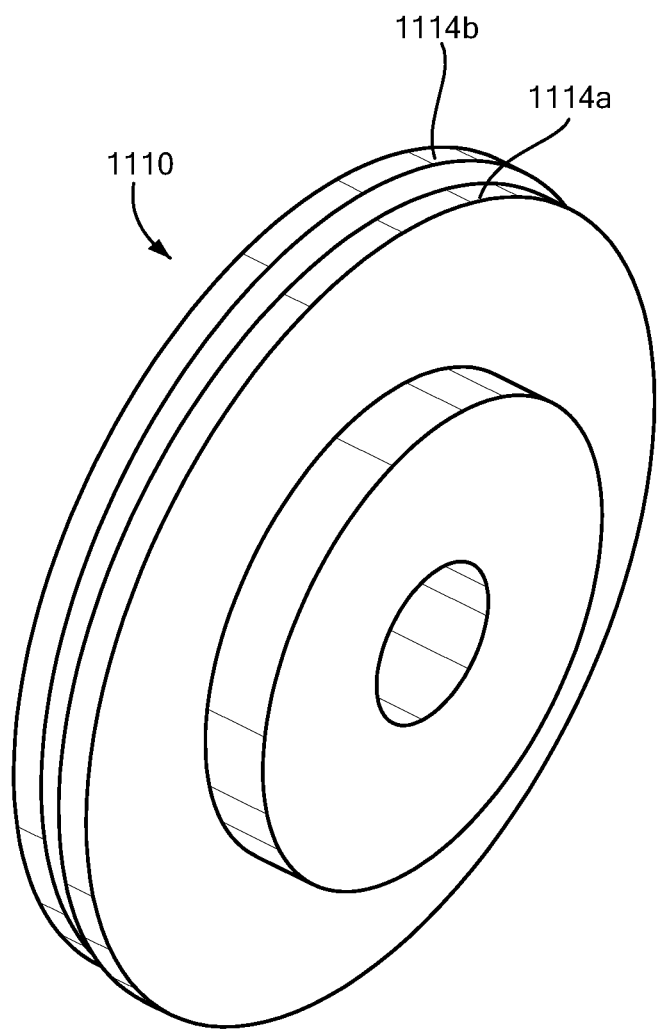
FIG. 11A is a perspective view of an example target of FIG. 11.

FIG. 11A is a perspective view of an example target 1110 having two tracks 1114*a*, 1114*b*. Tracks 1114*a*, 1114*b* can be similar to tracks 114*a*, 114*c*, respectively (FIGS. 1-2C). In use, sensor 1120 is installed in the system 1100 such that sensing elements 1124*a*, 1124*b* are positioned adjacent to respective target tracks 1114*a*, 1114*b*.

Referring to FIG. 12, position sensing system 1200 includes a sensor 1220 proximate to a target 1210. Target 1210 has two tracks 1214*a*, 1214*b*. Tracks 1214*a*, 1214*b* can be similar to tracks 1114*a*, 1114*c*, respectively (FIGS. 1-2C). In the embodiment of FIG. 12, each target track 1214*a*, 1214*b* is proximate to more than one sensing element. In particular, track 1214*a* is proximate to sensing elements 1224*a*, 1224*b* and track 1214*b* is proximate to sensing elements 1224*c*, 1224*d*.

Referring also to the plan view of sensor 1220 of FIG. 12A, when installed proximate to target 1210, elements 1124*a* and 1124*b* can be proximate to track 1214*a* and elements 1124*c* and 1124*d* can be proximate to track 1214*b* such that, as target 1210 rotates, track 1214*a* moves vertically with respect to the view of FIG. 12A past elements 1124*a*, 1124*b* and track 1214*b* moves vertically with respect to the view of FIG. 12A past elements 1124*a*, 1124*b*.

Each sensing element 1224*a*-1224*d* generates a respective sensing element output signal 1228*a*-1228*d*. Amplifiers 1230*a*-1230*d* are coupled to receive sensing elements output signals 1228*a*-1228*d* and a constant reference potential 1248 in order to generate differential signals 1232*a*-1232*d* as shown. Thus each amplifier 1230*a*-1230*d* receives the common reference potential 1248 and the resulting differential signals 1232*a*-1232*d* are periodic magnetic field signals having a substantially constant phase separation established by the distance between the target tracks 1214*a*, 1214*b*. The arrangement of FIG. 12 provides for redundancy in position detection without requiring additional target tracks.

Filters 1236*a*-1236*d* can be coupled to receive differential signals 1232*a*-1232*d* as shown and gain and/or offset adjustment can be applied to the filtered signals by gain and offset adjustment circuits 1240*a*-1240*d*.

The output signals 1244*a*, 1244*b* from gain and offset adjustment circuits 1240*a*, 1240*b* can be coupled to a position calculation unit 1250*a* to determine the absolute position of the target, such as the angular position of the target, by arctangent calculation. Similarly, output signals 1244*c*, 1244*d* from gain and offset adjustment circuits 1240*c*, 1240*d* can be coupled to a position calculation unit 1250*b* to determine the absolute position of the target, such as the angular position of the target, by arctangent calculation. Output format modules 1260*a*, 1260*b* can be coupled to position calculation units 1250*a*, 1250*b*, respectively to generate sensor output signals 1270*a*, 1270*b* indicative of the target position and in a format selected to suit the sensor application.

Figure 13:
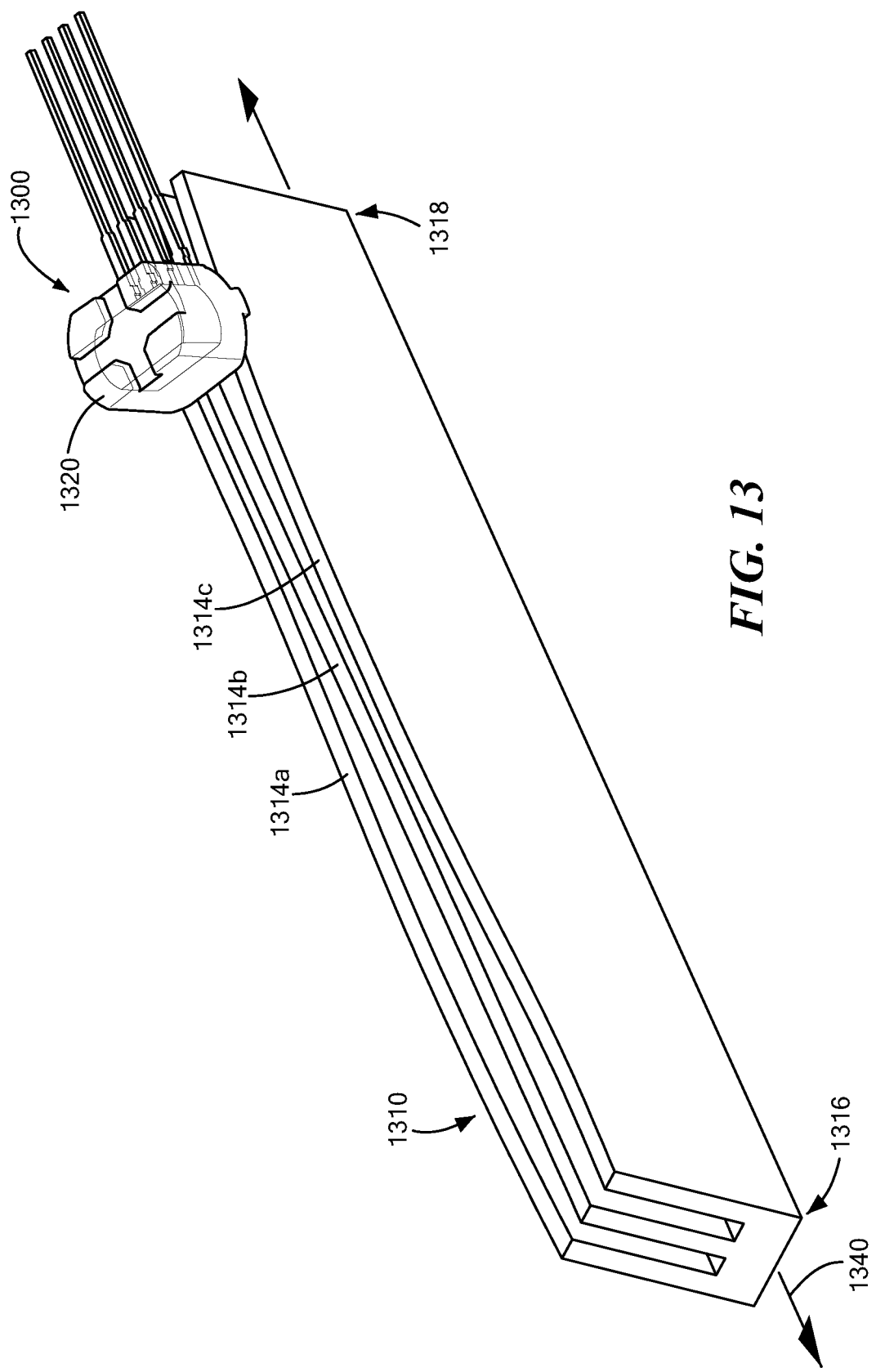
FIG. 13 is position sensing system including a magnetic field sensor proximate to a target configured for linear movement with respect to the sensor.

As noted above, sensors according to this disclosure can detect target position of targets configured for different types of movement with respect to the sensor (i.e., other than target rotation as in the above target examples). FIG. 13 illustrates a position detection system 1300 including a sensor 1320 proximate to a target 1310, which target is configured for linear movement along a movement axis 1340.

Target 1310 has multiple portions, or tracks 1310*a*, 1310*b*, 1310*c*. Sensor 1320 can be the same as or similar to any of sensors 120, 620, 720, 820, 920 and thus, includes a first magnetic field sensing element (that can be like element 124*a*) disposed proximate to the first target track 1314*a*, a second magnetic field sensing element (that can be like element 124*b*) disposed proximate to the second target track 1314*b*, and a third magnetic field sensing element (that can be like element 124*c*) disposed proximate to the third target track 1314*c*.

Figure 14:
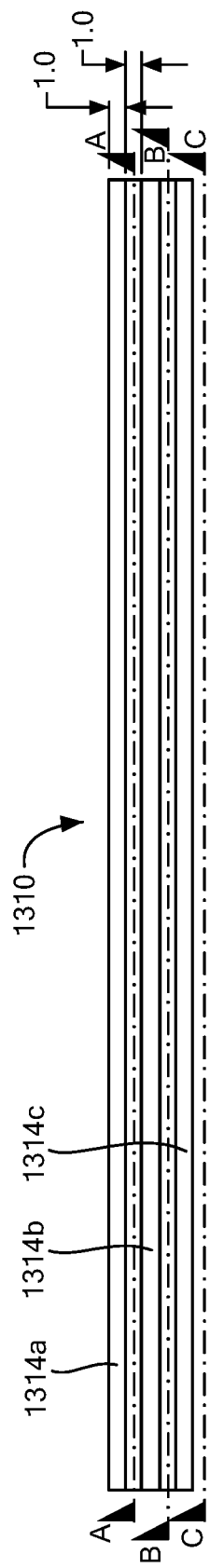
FIG. 14 is a cross-sectional view of the target of FIG. 13.
Figure 14A:
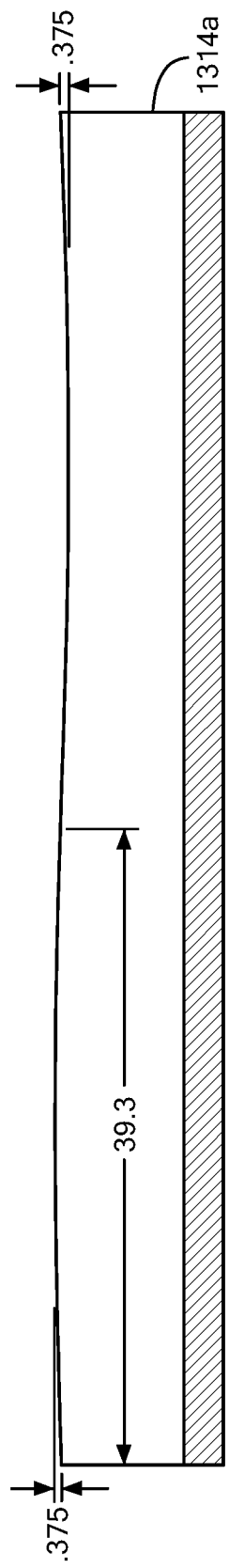
FIG. 14A is a cross-sectional view of the target of FIG. 14 taken along line A-A of FIG. 14.
Figure 14B:
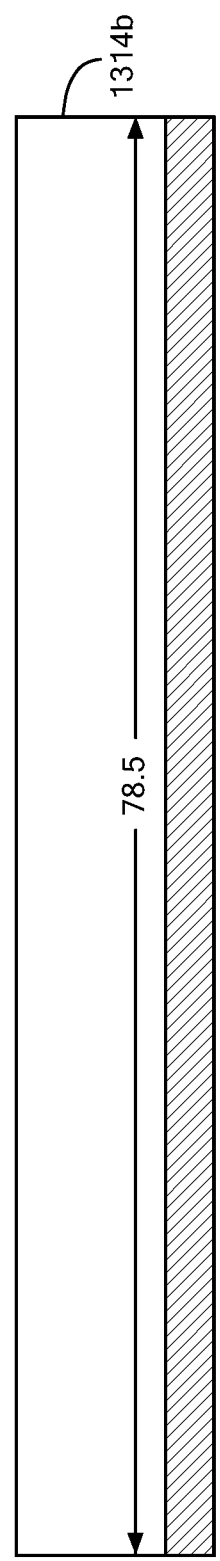
FIG. 14B is a cross-sectional view of the target of FIG. 14 taken along line B-B of FIG. 14.
Figure 14C:
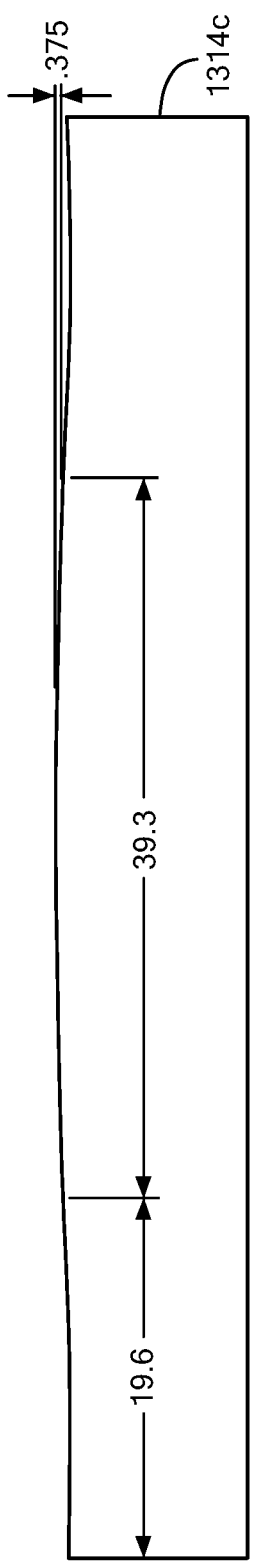
FIG. 14C is a cross-sectional view of the target of FIG. 14 taken along line C-C of FIG. 14.

Referring also to FIG. 14, a plan view of example target 1310 is shown and cross-sectional views along lines A-A, B-B, and C-C are shown in respective FIGS. 14A, 14B, and 14C. As is apparent from consideration of FIGS. 14A and 14C, movement of the target 1310 relative to the sensor 1320 from a first end 1316 to a second end 1318 corresponds to a single period of the resulting magnetic field signals and center track 1314*b* provides a constant reference. Stated differently, in the example target 1310, tracks 1314*a*, 1314*b* are designed to generate magnetic field signals having an angle of repetition equal to 360° to achieve a single period per target revolution. As will be appreciated, the dimensions of target tracks 1314*a*, 1314*c* can be varied to cause more than one period per target movement from end 1316 to 1318 in the resulting magnetic field signals.

Figure 15:
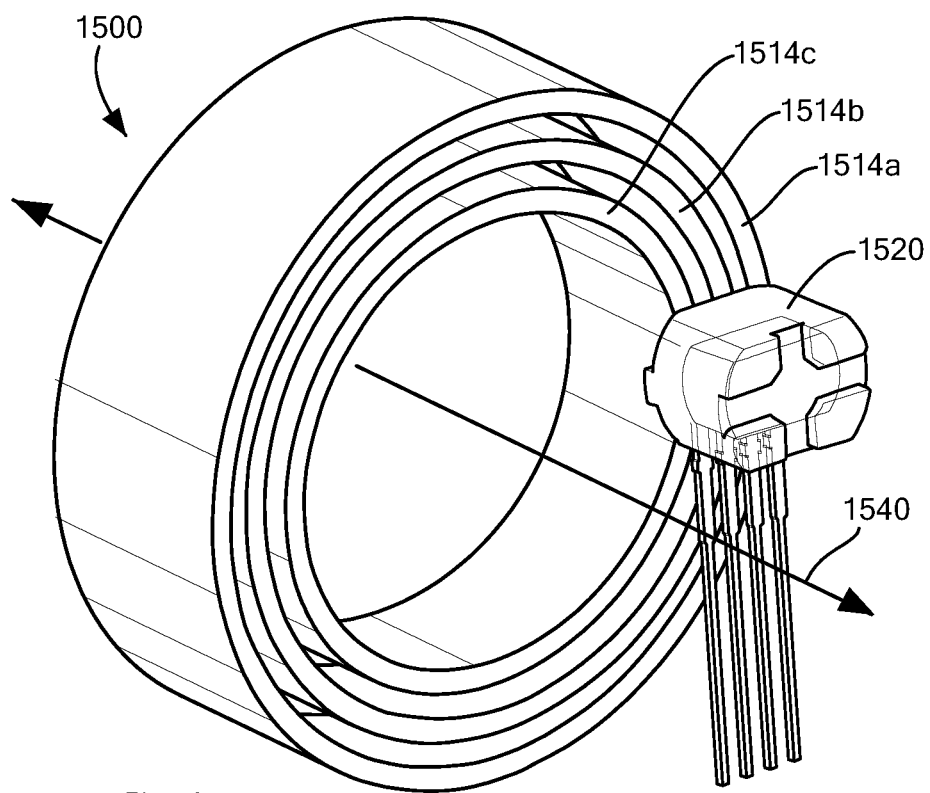
FIG. 15 is a perspective view of a position sensing system including a magnetic field sensor proximate to a rotatable target, with the sensor axially positioned with respect to the axis of rotation.

Referring to FIG. 15, position detection system 1500 includes a sensor 1520 proximate to a target 1510 capable of movement relative to the sensor. Example target 1510 is rotatable about an axis of rotation 1540 and here, the sensing elements of sensor 1520 are positioned axially with respect to the axis of rotation 1540 (as contrasted to being positioned radially with respect to the axis of rotation as in the embodiment of FIG. 1).

Target 1510 has multiple portions, or tracks 1514*a*, 1514*b*, 1514*c*. Sensor 1520 can be the same as or similar to any of sensors 120, 620, 720, 820, 920 and thus, includes a first magnetic field sensing element (that can be like element 124*a*) disposed proximate to the first target track 1514*a*, a second magnetic field sensing element (that can be like element 124*b*) disposed proximate to the second target track 1514*b*, and a third magnetic field sensing element (that can be like element 124*c*) disposed proximate to the third target track 1514*c*.

Figure 16:
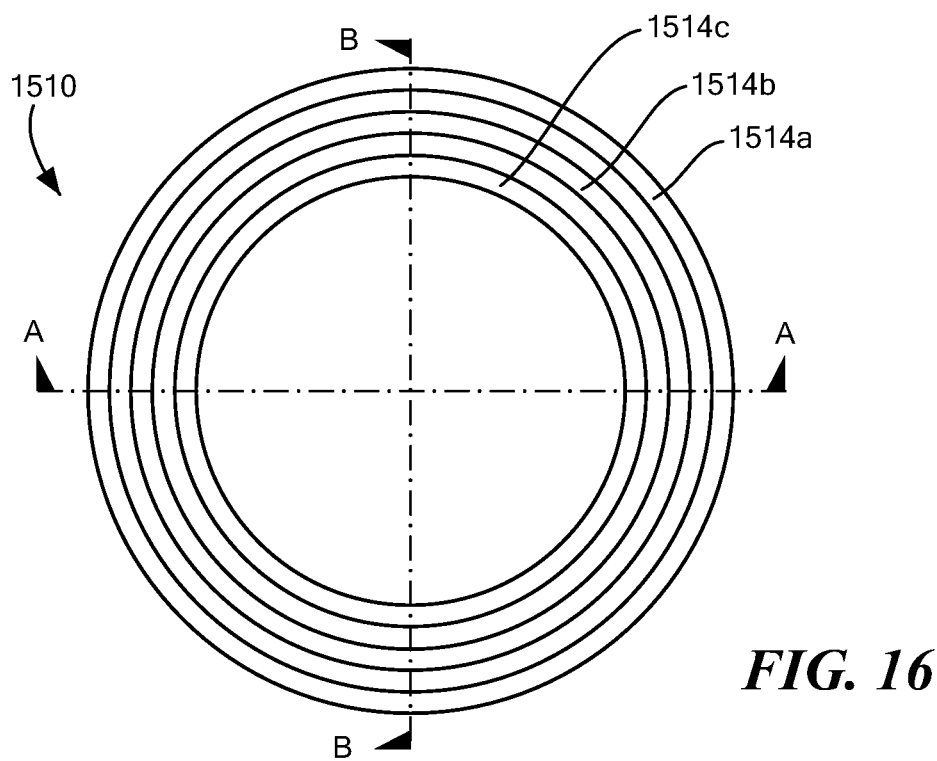
FIG. 16 is a plan view of the target of FIG. 15.
Figure 16A:
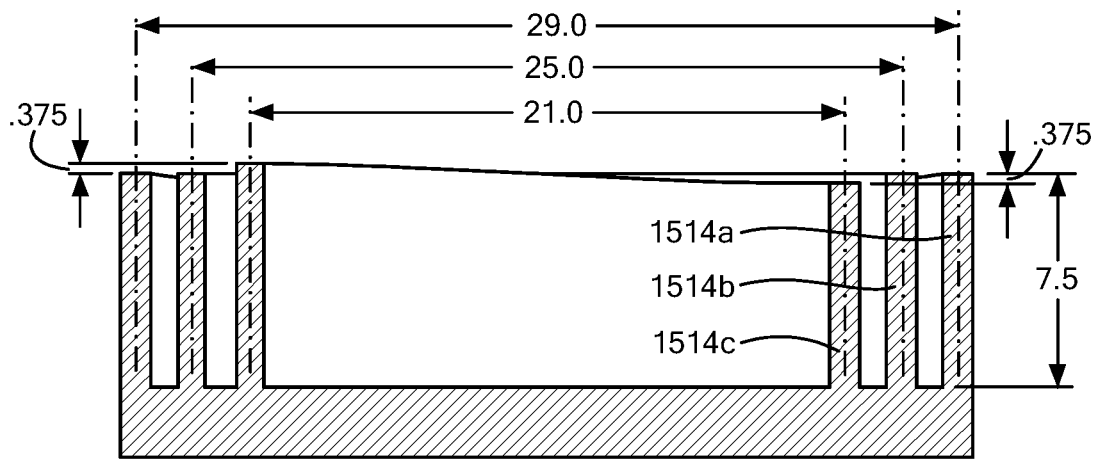
FIG. 16A is a cross-sectional view of the target of FIG. 16 taken along line A-A of FIG. 16.
Figure 16B:
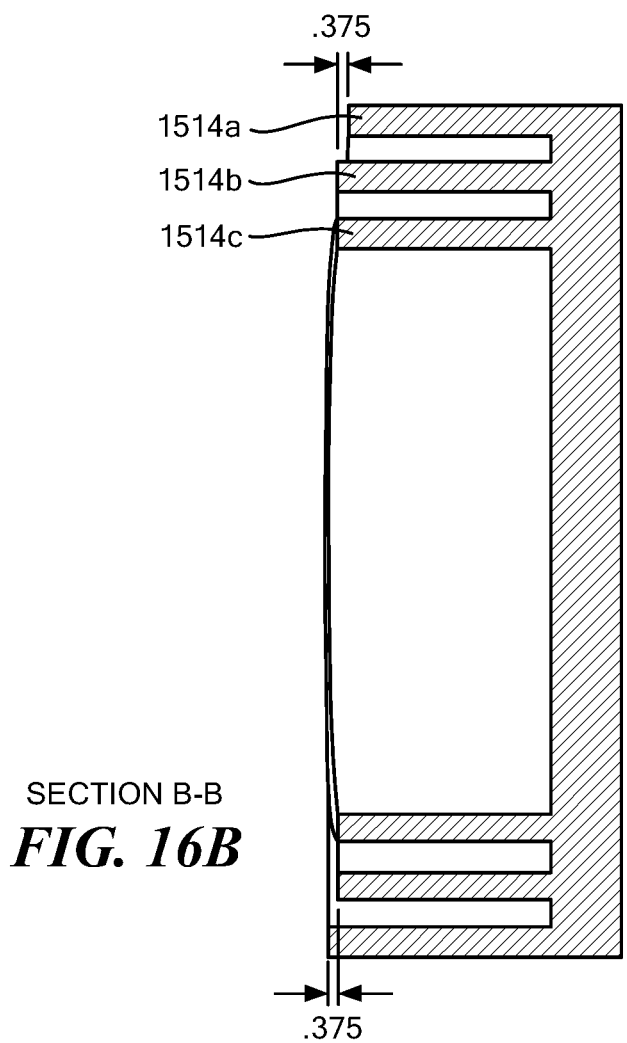
FIG. 16B is a cross-sectional view of the target of FIG. 16 taken along line B-B of FIG. 16.

Referring also to FIG. 16, a plan view of example target 1510 is shown and cross-sectional views along lines A-A, B-B are shown in respective FIGS. 16A and 16B. A single rotation of target 1510 relative to the sensor 1520 corresponds to a single period of the resulting magnetic field signals and center track 1514*b* provides a constant reference. Stated differently, in the example target 1510, tracks 1514*a*, 1514*b* are designed to generate magnetic field signals having an angle of repetition equal to 360° to achieve a single period per target revolution. As will be appreciated, the dimensions of target tracks 1514*a*, 1514*b* can be varied to cause more than one period per target revolution in the resulting magnetic field signals.

Referring also to FIGS. 17 and the enlarged side view taken along line 17A-17A, an alternative target 1710 illustrates a design in which different so-called tracks are contiguous (as contrasted to being discrete tracks that extend from the central hub 116 of FIGS. 1-2 for example). In other words, target 1710 can be considered to include three tracks 1710*a*, 1710*b*, 1710*c*. When a sensor (like sensor 120 or 620 for example) is positioned proximate to target 1710 with a first sensing element 124*a* proximate to first track 1714*a*, a second sensing element 124*b* proximate to second track 1714*b*, and a third sensing element 124*c* proximate to third track 1714*c*, operation of sensor 120 to detect the absolute position of target 1710 is as described above.

Referring also to FIG. 18, position sensing system 1800 includes a sensor 1820 proximate to a target 1810. Target 1810 can have four portions or tracks 1014*a*-1014*d*, each proximate to a respective sensing element 1824*a*-1824*b* of sensor 1820. Each target track 1014*a*-1014*d* can generate a periodic magnetic field signal like tracks 114*a*, 114*c* of FIGS. 1-2C (i.e., rather than a constant reference). Sensor 1820 can have "in-line" sensing elements (e.g., as shown in connection with sensor 1020 in FIG. 10A).

Output signals 1828*a*-1828*d* of sensing elements 1824*a*-1824*b* are filtered by respective filters 1836*a*-1836*d* and converted into digital signals by ADCs 1838*a*-1838*d*. Gain and offset adjustment can be implemented by respective circuits 1840*a*-1840*d*. Differential magnetic field signals are generated using a constant reference 1848.

Output signals 1828*a*-1828*d* of sensing elements 1824*a*-1824*b* are coupled in an overlapping fashion. In particular, summation element 1842*a* is coupled to receive processed magnetic field signal 1828*a* and constant 1848 to generate magnetic field signal 1844*a* and summation element 1842*c* is coupled to receive processed magnetic field signal 1828*c* and constant 1848 to generate magnetic field signal 1844*c*. Signals 1844*a*, 1844*c* are used by position calculation circuit 1850*a* to compute a position value for further processing by DAC 1856*a* and output format module 1860*a* to generate sensor output signal 1870*a*. Similarly, summation element 1842*b* is coupled to receive processed magnetic field signal 1828*b* and constant 1848 to generate magnetic field signal 1844*b* and summation element 1842*d* is coupled to receive processed magnetic field signal 1828*d* and constant 1848 to generate magnetic field signal 1844*d*. Signals 1844*b*, 1844*d* are used by position calculation circuit 1850*b* to compute a position value for further processing by DAC 1856*b* and output format module 1860*b* to generate sensor output signal 1870*b*.

Use of non-adjacent elements (e.g., elements 1824*a*, 1824*c* and elements 1824*b*, 1824*d*) to generate position signals in this manner can improve detection accuracy performance by resulting in less interference between target tracks. In other words, detecting target position based on signals 1828*a* and 1828*c* from non-adjacent elements 1824*a* and 1824*c* can be more accurate than detecting target position based on signals 1828*a* and 1828*b* from adjacent elements 1824*a* and 1824*b* for example.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed is:

1. A magnetic field sensor for sensing an absolute position of a target, comprising:
    a first magnetic field sensing element disposed proximate to a first portion of the target having a first cross-sectional shape configured to generate a first periodic magnetic field signal in response to movement of the first target portion;
    a second magnetic field sensing element disposed proximate to a second portion of the target having a second cross-sectional shape configured to generate a second periodic magnetic field signal in response to movement of the second target portion, wherein the first periodic magnetic field signal and the second periodic magnetic field signal have a phase separation that does not change with movement of the target and wherein each of the first magnetic field signal and the second magnetic field signal has a constant reference potential;
    a third magnetic field sensing element disposed proximate to a third portion of the target having a third cross-sectional shape configured to generate the constant reference potential in response to movement of the third target portion;
    a position detection module configured to use the first magnetic field signal, the second magnetic field signal, and the constant reference potential to generate a position value indicative of the absolute position of the target; and
    an output format module coupled to receive the position value and configured to generate an output signal of the magnetic field sensor.

2. The magnetic field sensor of claim 1, wherein the first cross-sectional shape of the first target portion and the second cross-sectional shape of the second target portion are substantially oval and wherein the first periodic magnetic field signal is substantially sinusoidal and the second periodic magnetic field signal is substantially sinusoidal.

3. The magnetic field sensor of claim 1, wherein the first periodic magnetic field signal has a first repeating pattern and the second periodic magnetic field signal has a second repeating pattern and wherein each of a first angle of repetition of the first repeating pattern and a second angle of repetition of the second repeating pattern is equal to 360°.

4. The magnetic field sensor of claim 3, wherein each the first cross-sectional shape of the first target portion and the second cross-sectional shape of the second target portion has a single axis of symmetry.

5. The magnetic field sensor of claim 4, wherein the axes of symmetry of the first cross-sectional shape of the first target portion and the second cross-sectional shape of the second target portion are offset from each other by a predetermined non-zero angle.

6. The magnetic field sensor of claim 5, wherein the predetermined non-zero angle between the axes of symmetry of the first cross-sectional shape of the first target portion and the second cross-sectional shape of the second target portion is ninety degrees.

7. The magnetic field sensor of claim 1, wherein the phase separation between the first periodic magnetic field signal and the second periodic magnetic field signal is ninety degrees.

8. The magnetic field sensor of claim 1, wherein the first periodic magnetic field signal has a first repeating pattern and the second periodic magnetic field signal has a second repeating pattern, and wherein an angle of repetition of the first repeating pattern is the same as an angle of repetition of the second repeating pattern.

9. The magnetic field sensor of claim 1, wherein the first periodic magnetic field signal has a first repeating pattern and the second periodic magnetic field signal has a second repeating pattern, and wherein an angle of repetition of the first repeating pattern is different than an angle of repetition of the second repeating pattern.

10. The magnetic field sensor of claim 1, wherein the absolute position of the target comprises an absolute angle of rotation of the target.

11. The magnetic field sensor of claim 10, wherein the target is configured to rotate about an axis of rotation with each of the first and second target portions rotatable about the axis of rotation and wherein the magnetic field sensor is positioned radially with respect to the axis of rotation of the target.

12. The magnetic field sensor of claim 10, wherein the target is configured to rotate about an axis of rotation with each of the first and second target portions rotatable about the axis of rotation and wherein the magnetic field sensor is positioned axially with respect to the axis of rotation of the target.

13. The magnetic field sensor of claim 1, wherein the target is configured to move linearly with respect to the magnetic field sensor.

14. The magnetic field sensor of claim 1, wherein the third cross-sectional shape of the third target portion is circular.

15. The magnetic field sensor of claim 1, further comprising a magnet, wherein the first magnetic field sensing element and the second magnetic field sensing element are disposed between the magnet and the target.

16. The magnetic field sensor of claim 1, wherein the target comprises a ring magnet.

17. The magnetic field sensor of claim 1, wherein the first portion of the target is spaced from the second portion of the target, and the phase separation between the first periodic magnetic field signal and the second periodic magnetic field signal is based on a separation distance between the first portion of the target and the second portion of the target.

18. A system comprising:
a target comprising a plurality of tracks, wherein a first one of the plurality of tracks is spaced from a second one of the plurality of tracks by a predetermined distance; and
a magnetic field sensor for sensing an absolute position of the target, comprising:
a first magnetic field sensing element disposed proximate to a first track of the plurality of tracks and configured to generate a first periodic magnetic field signal in response to movement of the first track;
a second magnetic field sensing element disposed proximate to the second track of the plurality of tracks and configured to generate a second periodic magnetic field signal in response to movement of the second track, wherein the first periodic magnetic field signal and the second periodic magnetic field signal have a phase separation associated with the predetermined distance between the first track and the second track that does not change with movement of the target and wherein each of the first magnetic field signal and the second magnetic field signal has a constant reference potential;
a third magnetic field sensing element disposed proximate to a third track of the plurality of tracks configured to generate the constant reference potential in response to movement of the third track;
a position detection module configured to use the first magnetic field signal, the second magnetic field signal, and the constant reference potential to generate a position value indicative of the absolute position of the target; and
an output format module coupled to receive the position value and configured to generate an output signal of the magnetic field sensor.

19. The magnetic field sensor of claim 18, wherein the phase separation between the first periodic magnetic field signal and the second periodic magnetic field signal is ninety degrees.

20. The magnetic field sensor of claim 18, wherein the target is rotatable about an axis of rotation and wherein the magnetic field sensor is configured to sense an absolute rotational position of the target.

* * * * *

UNITED STATES PATENT AND TRADEMARK OFFICE
CERTIFICATE OF CORRECTION

PATENT NO. : 11,346,688 B2
APPLICATION NO. : 16/920869
DATED : May 31, 2022
INVENTOR(S) : Logan G. Stewart Page 1 of 2

It is certified that error appears in the above-identified patent and that said Letters Patent is hereby corrected as shown below:

In the Specification

Column 8, Line 60 delete "tracks as 114a-114c" and replace with --tracks 114a-114c--.

Column 9, Line 24 delete "124b and" and replace with --124c and--.

Column 12, Line 23 delete "elements" and replace with --element--.

Column 13, Lines 4-5 delete "elements" and replace with --element--.

Column 13, Line 24 delete "860a, 860b" and replace with --850a, 850b--.

Column 15, Line 15 delete "1024a-1024b" and replace with --1024a-1024d--.

Column 15, Lines 53-54 delete "1014a-1014b." and replace with --1014a-1014d.--.

Column 16, Line 28 delete "1148, as shown." and replace with --1118, as shown.--.

Column 16, Line 30 delete "1148" and replace with --1118--.

Column 17, Line 2 delete "1124a, 1124b." and replace with --1124c, 1124d--.

Column 17, Line 5 delete "elements" and replace with --element--.

Column 17, Lines 41-42 delete "1310a, 1310b, 1310c." and replace with --1314a, 1314b, 1314c.--.

Column 17, Line 64 delete "to 1318" and replace with --to end 1318--.

Column 18, Line 36 delete "1710a, 1710b, 1710c." and replace with --1714a, 1714b, 1714c.--.

Signed and Sealed this
Eighteenth Day of July, 2023

Katherine Kelly Vidal
*Director of the United States Patent and Trademark Office*

Column 18, Line 45 delete "1014a-1014d," and replace with --1814a-1814d--.

Column 18, Line 46 delete "1824a-1824b" and replace with --1824a-1824d--.

Column 18, Line 47 delete "1014a-1014d" and replace with --1814a-1814d--.

Column 18, Lines 52-53 delete "1824a-1824b" and replace with --1824a-1824d--.

Column 18, Lines 58-59 delete "1824a-1824b" and replace with --1824a-1824d--.

In the Claims

Column 20, Line 7 in Claim 4, delete "each the" and replace with --each of the--.